(12) United States Patent
Suh et al.

(10) Patent No.: US 11,015,814 B2
(45) Date of Patent: May 25, 2021

(54) COOKING APPARATUS AND METHOD OF CONTROLLING THE SAME

(71) Applicant: Samsung Electronics Co., Ltd., Suwon-si (KR)

(72) Inventors: Seung Wook Suh, Yongin-si (KR); Jae Moon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 15/774,799

(22) PCT Filed: Oct. 31, 2016

(86) PCT No.: PCT/KR2016/012380
§ 371 (c)(1),
(2) Date: May 9, 2018

(87) PCT Pub. No.: WO2017/082566
PCT Pub. Date: May 18, 2017

(65) Prior Publication Data
US 2018/0328589 A1    Nov. 15, 2018

(30) Foreign Application Priority Data

Nov. 9, 2015 (KR) .................... 10-2015-0156517

(51) Int. Cl.
*H05B 3/68* (2006.01)
*H05B 6/12* (2006.01)
(Continued)

(52) U.S. Cl.
CPC ........... *F24C 7/043* (2013.01); *A47J 37/0676* (2013.01); *F24C 15/105* (2013.01);
(Continued)

(58) Field of Classification Search
CPC .......... A47J 37/067–0676; A47J 37/12–1209; H05B 1/0258–0266; H05B 3/68–686;
(Continued)

(56) References Cited

U.S. PATENT DOCUMENTS

| 4,217,481 A | 8/1980 | Fischer |
| 5,070,222 A | 12/1991 | Yahav et al. |

(Continued)

FOREIGN PATENT DOCUMENTS

| CH | 698933 | 12/2009 |
| CN | 104619180 | 5/2015 |

(Continued)

OTHER PUBLICATIONS

English translation of JP 2007143804 to Takashima (Year: 2007).*

(Continued)

*Primary Examiner* — Michael A Laflame, Jr.
(74) *Attorney, Agent, or Firm* — Staas & Halsey LLP

(57) ABSTRACT

A cooking device and a control method thereof is provided which heating a curved area to a higher temperature than a flat area of a cooking area where food is cooked. A cooking apparatus includes a cooking unit having one side in which a first cooking region and a second cooking region distinguished from the first cooking region are provided; a heating unit configured to heat the cooking unit; and a controller configured to control the heating unit to heat the first cooking region to a first temperature and to heat the second cooking region to a second temperature different from the first temperature.

15 Claims, 27 Drawing Sheets

(51) Int. Cl.
  *F24C 15/10* (2006.01)
  *F24C 7/04* (2021.01)
  *A47J 37/06* (2006.01)
  *H05B 1/02* (2006.01)
(52) U.S. Cl.
  CPC ......... *H05B 1/0266* (2013.01); *A47J 37/0629* (2013.01); *F24H 2250/08* (2013.01); *H05B 6/1209* (2013.01)
(58) Field of Classification Search
  CPC ........ H05B 6/12–1236; H05B 2213/03; F24C 15/10–106
  See application file for complete search history.

(56) References Cited

U.S. PATENT DOCUMENTS

| | | | |
|---|---|---|---|
| 5,072,096 A * | 12/1991 | Schreder | F24C 15/102 219/451.1 |
| 5,743,173 A | 4/1998 | Hayashi et al. | |
| 6,268,592 B1 | 7/2001 | Hu et al. | |
| 6,930,287 B2 * | 8/2005 | Gerola | H05B 3/746 219/447.1 |
| 8,884,196 B2 | 11/2014 | Jeanneteau et al. | |
| 9,980,320 B2 * | 5/2018 | Eng | H05B 1/0266 |
| 10,085,592 B1 * | 10/2018 | Cheng | A47J 37/0676 |
| 10,368,691 B2 * | 8/2019 | Allemand | A47J 36/025 |
| 2001/0025843 A1 | 10/2001 | McClean | |
| 2009/0159589 A1 * | 6/2009 | Gratz | F24C 15/102 219/445.1 |
| 2009/0261088 A1 * | 10/2009 | Isoda | F24C 7/082 219/489 |
| 2013/0056457 A1 * | 3/2013 | Lee | F24C 7/083 219/620 |
| 2013/0270251 A1 * | 10/2013 | Furuti | F24C 7/083 219/445.1 |
| 2016/0050720 A1 * | 2/2016 | Jeanneteau | H05B 6/062 219/445.1 |
| 2016/0118808 A1 * | 4/2016 | Van Wageningen | H05B 6/1236 307/104 |
| 2016/0169527 A1 * | 6/2016 | Deng | F24C 3/082 426/523 |
| 2017/0027378 A1 * | 2/2017 | Millett | A47J 27/004 |
| 2017/0064775 A1 * | 3/2017 | Richardson | H05B 6/062 |
| 2019/0125120 A1 * | 5/2019 | Jenkins | F24C 7/087 |

FOREIGN PATENT DOCUMENTS

| | | |
|---|---|---|
| JP | 2007-143804 | 6/2007 |
| KR | 10-2004-0105533 | 12/2004 |
| KR | 10-2008-0066165 | 7/2008 |
| WO | WO 90/08495 | 8/1990 |
| WO | 2014/089308 | 6/2014 |

OTHER PUBLICATIONS

Extended European Search Report dated Oct. 8, 2018 in corresponding European Patent Application No. 16864492.0.
International Search Report dated Feb. 17, 2017 in corresponding International Patent Application No. PCT/KR2016/012380.
Written Opinion of the International Searching Authority dated Feb. 17, 2017 in corresponding International Patent Application No. PCT/KR2016/012380.
European Communication dated May 21, 2019 in European Patent Application No. 16864492.0.
Chinese Office Action dated Dec. 24, 2019 in Chinese Patent Application No. 201680065543.9.
Chinese Office Action dated Sep. 8, 2020 from Chinese Application No. 201680065543.9, 16 pages.
Indian Office Action dated Oct. 6, 2020 from Indian Application No. 201817021086, 6 pages.
Chinese Office Action dated Dec. 10, 2020 from Chinese Patent Application No. 201680065543.9, 16 pages.

* cited by examiner

[Fig. 1]
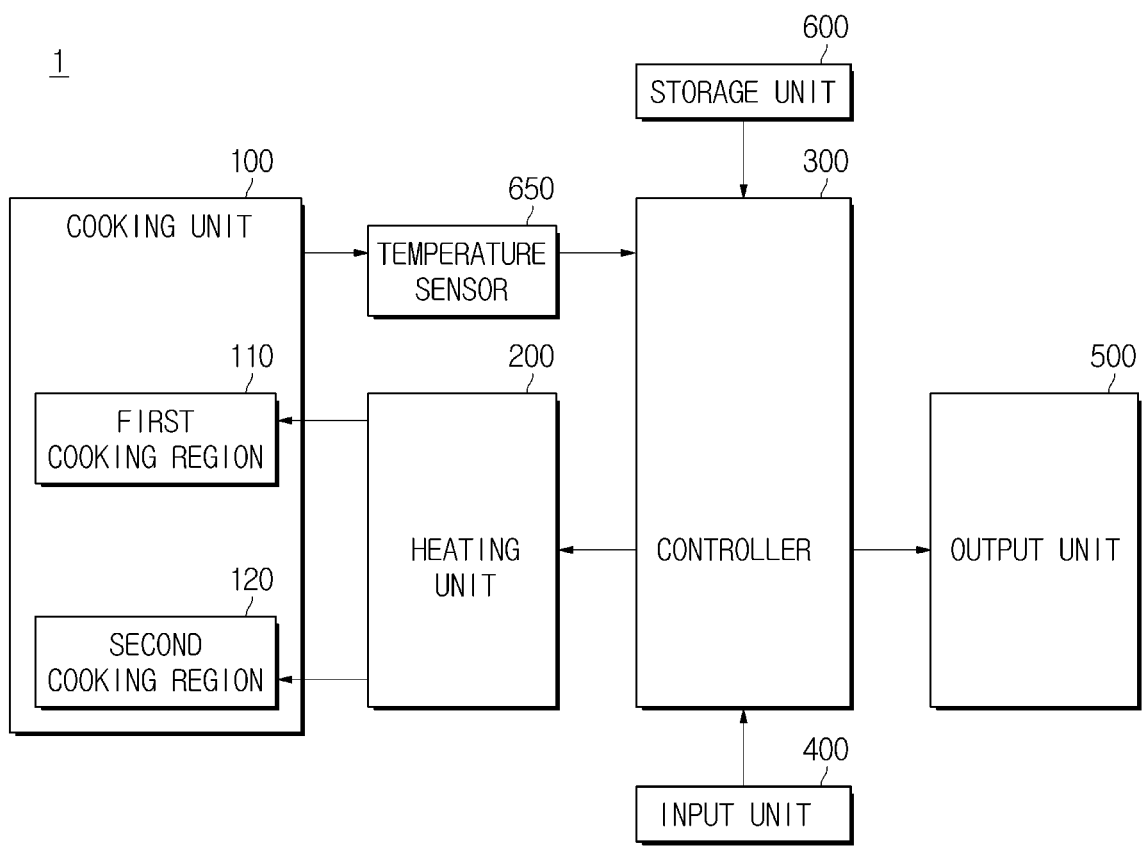

【Fig. 2a】
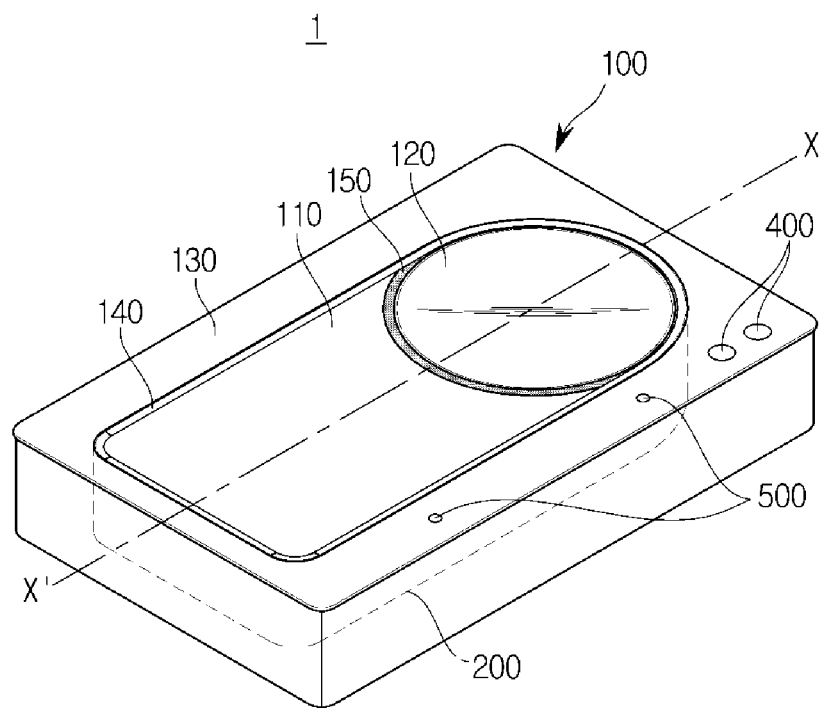

[Fig. 2b]
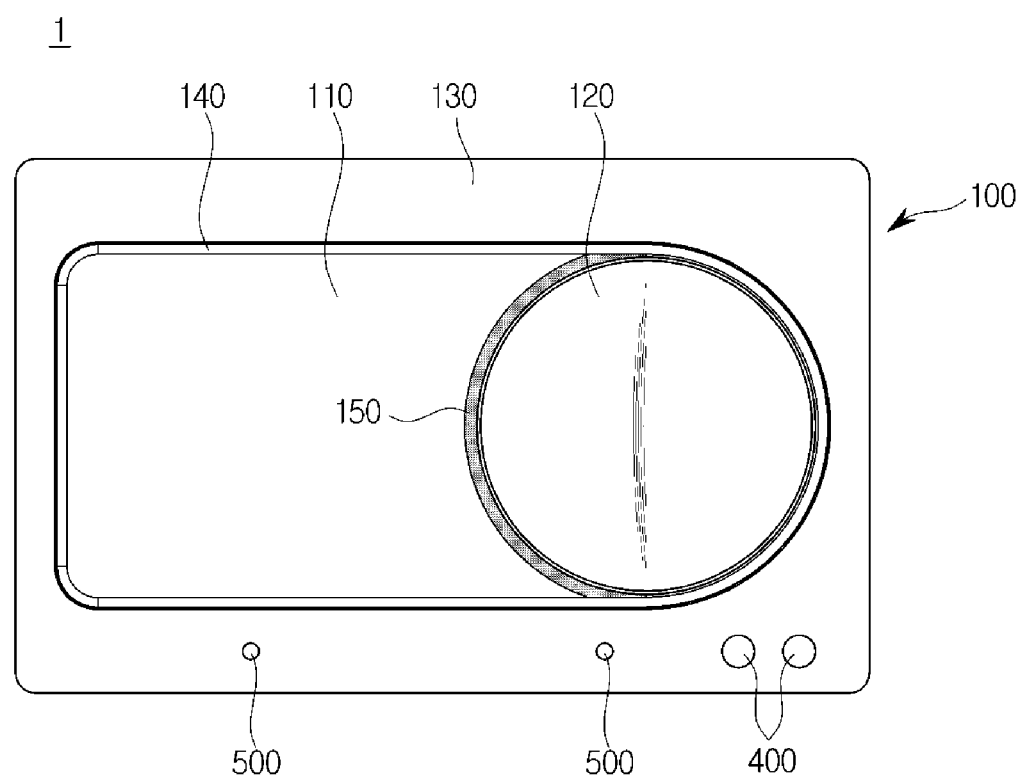

[Fig. 2c]
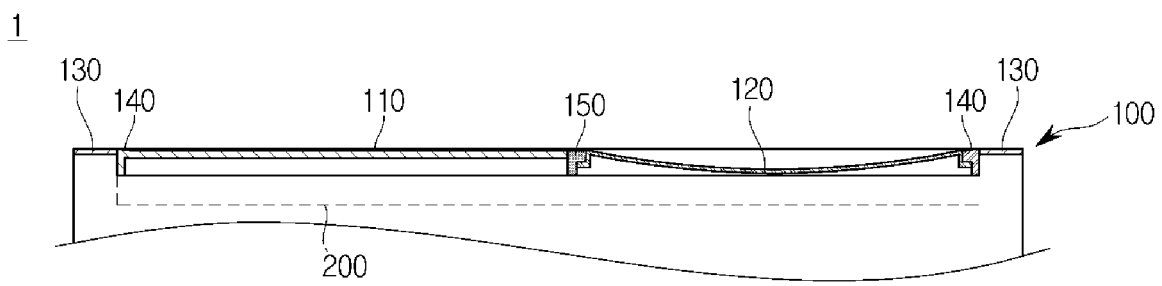

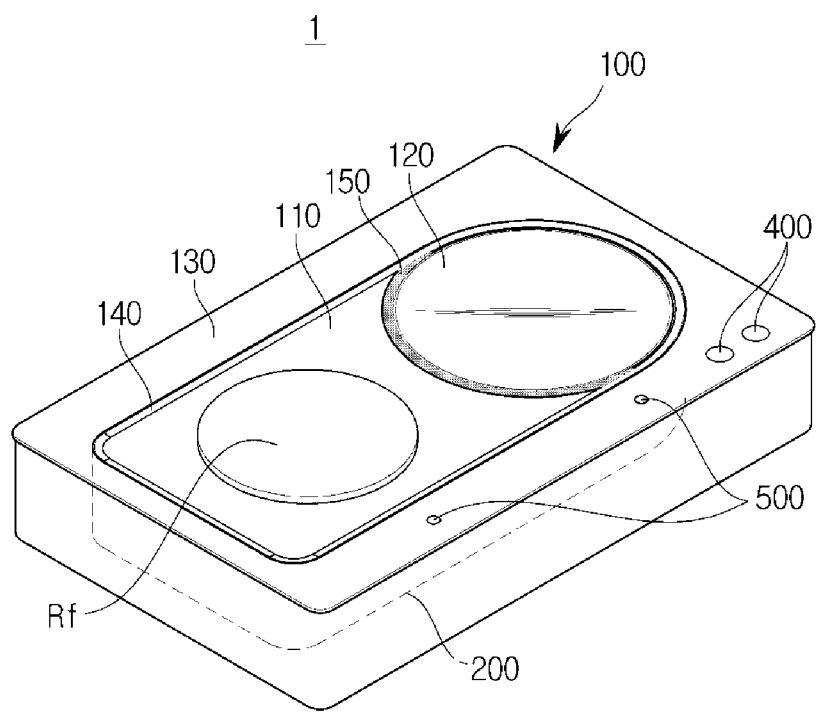
[Fig. 3a]

[Fig. 3b]
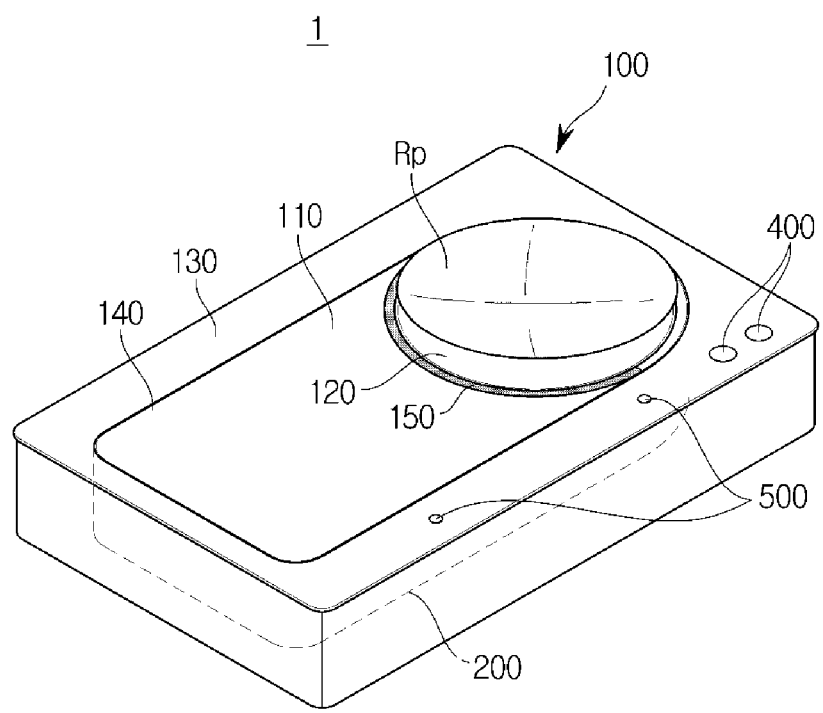

[Fig. 4a]
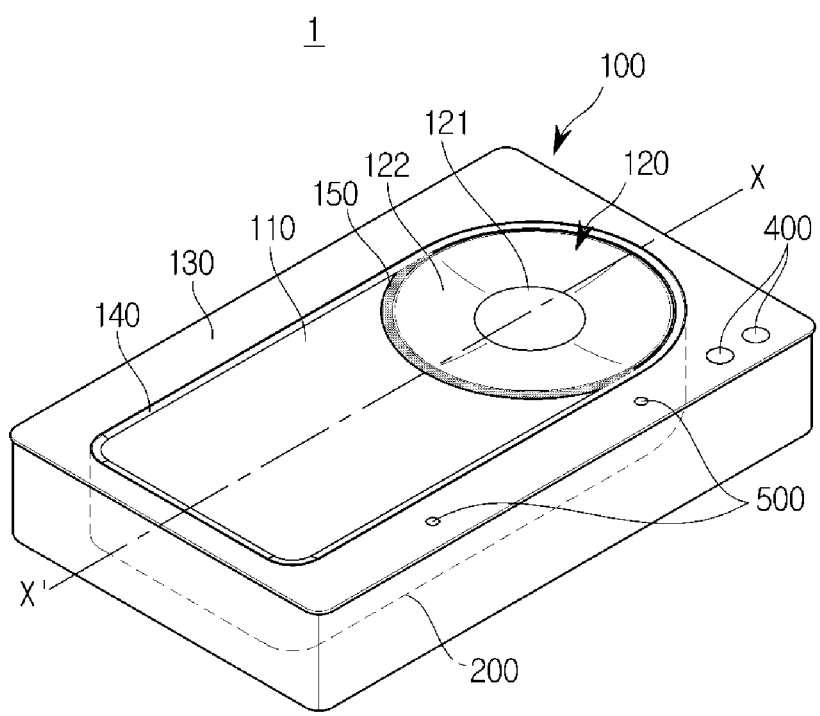

【Fig. 4b】
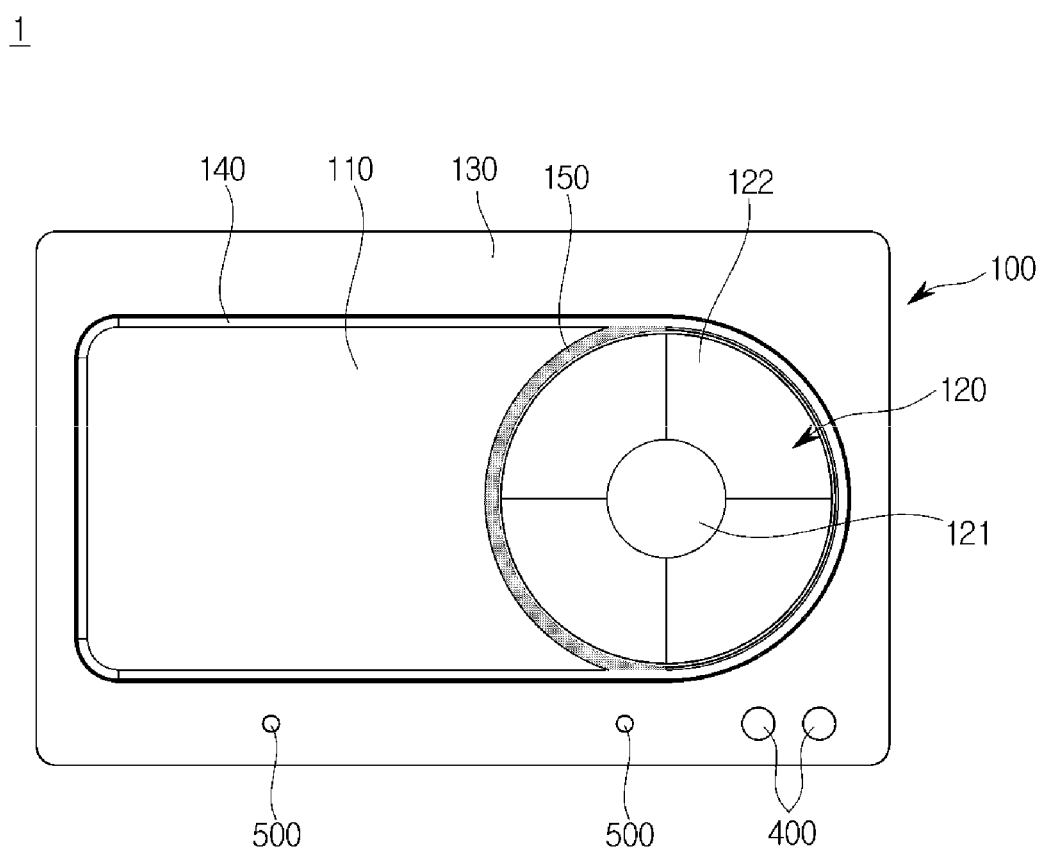

[Fig. 4c]
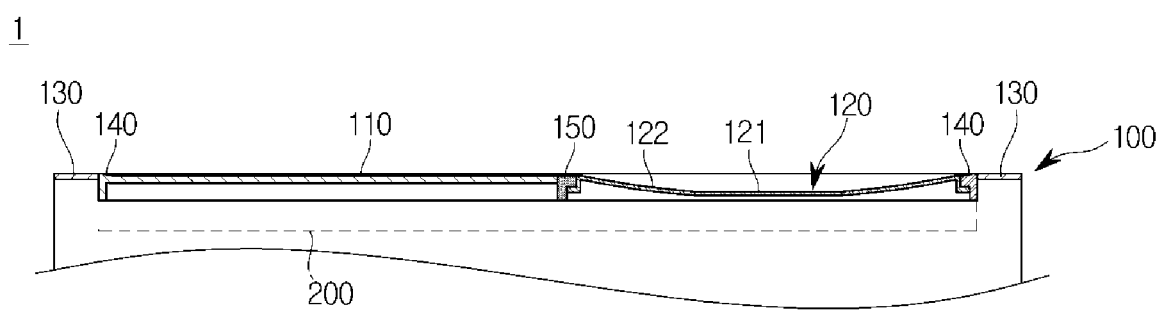

[Fig. 5a]
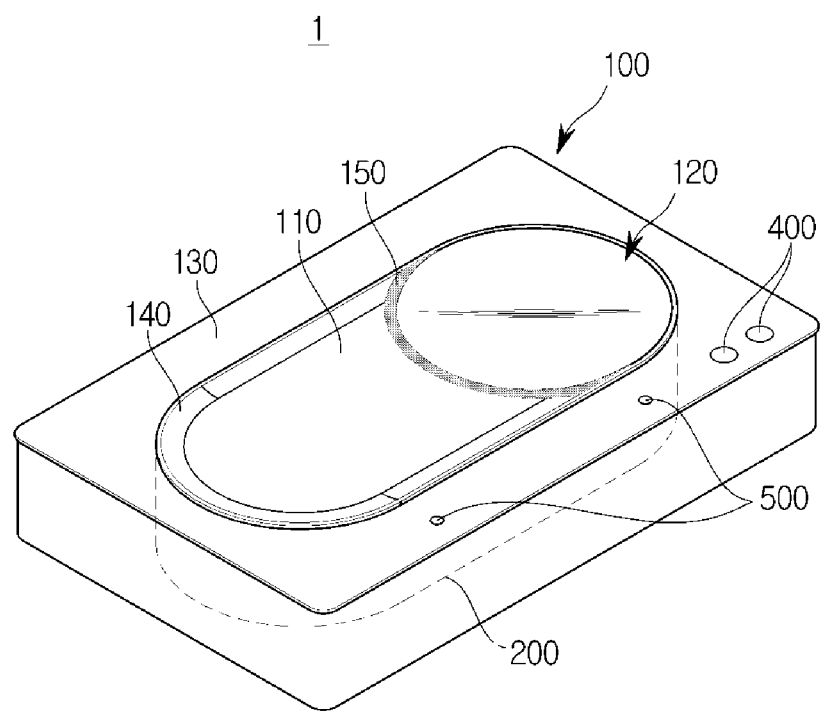

【Fig. 5b】
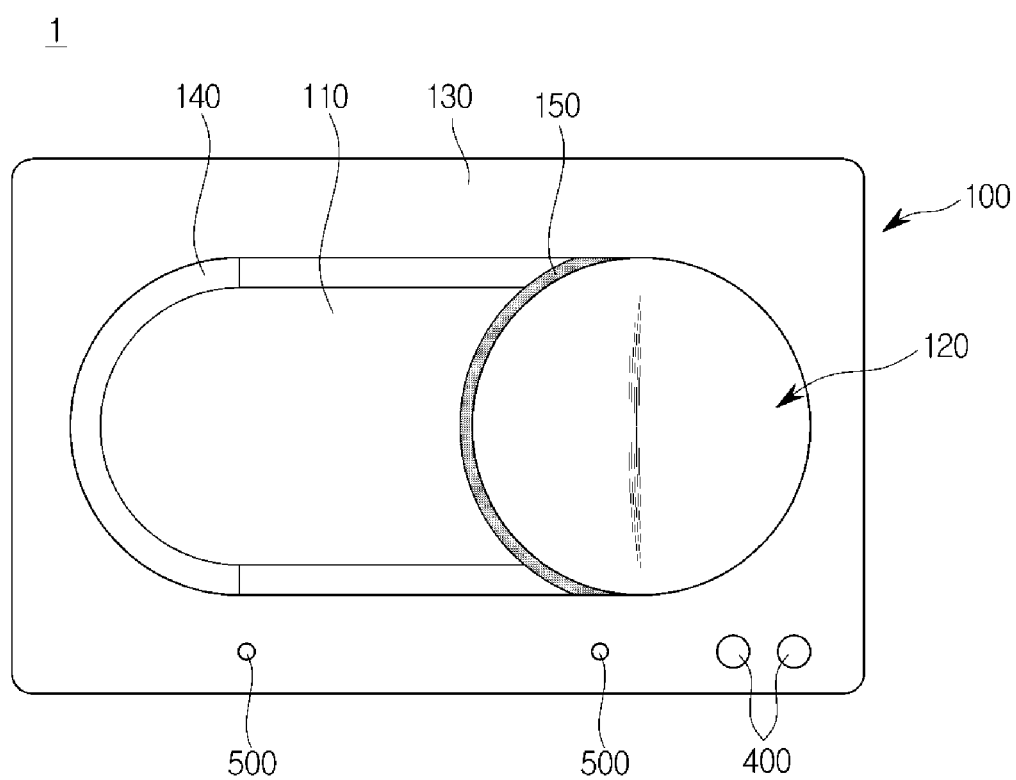

【Fig. 6a】
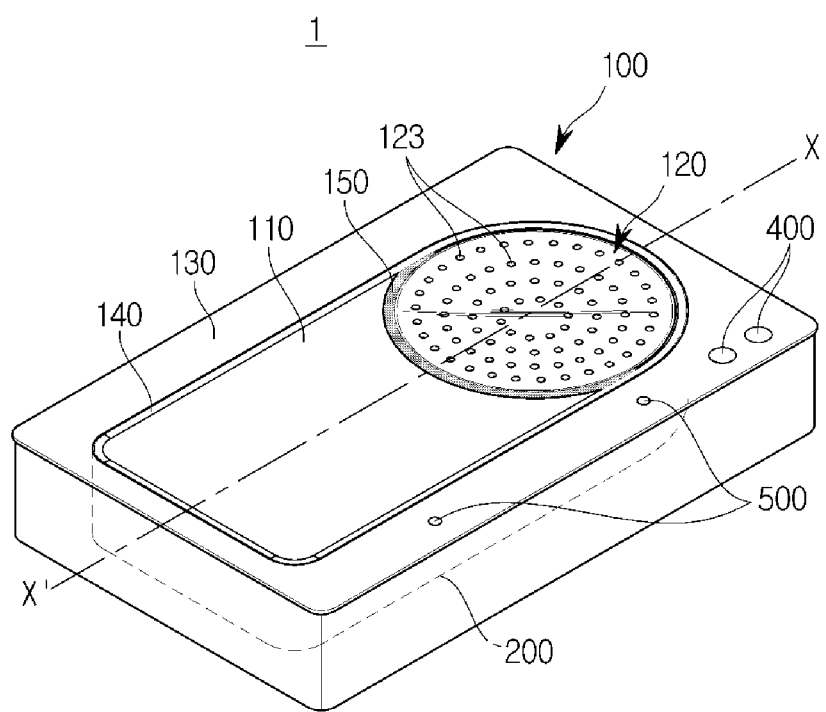

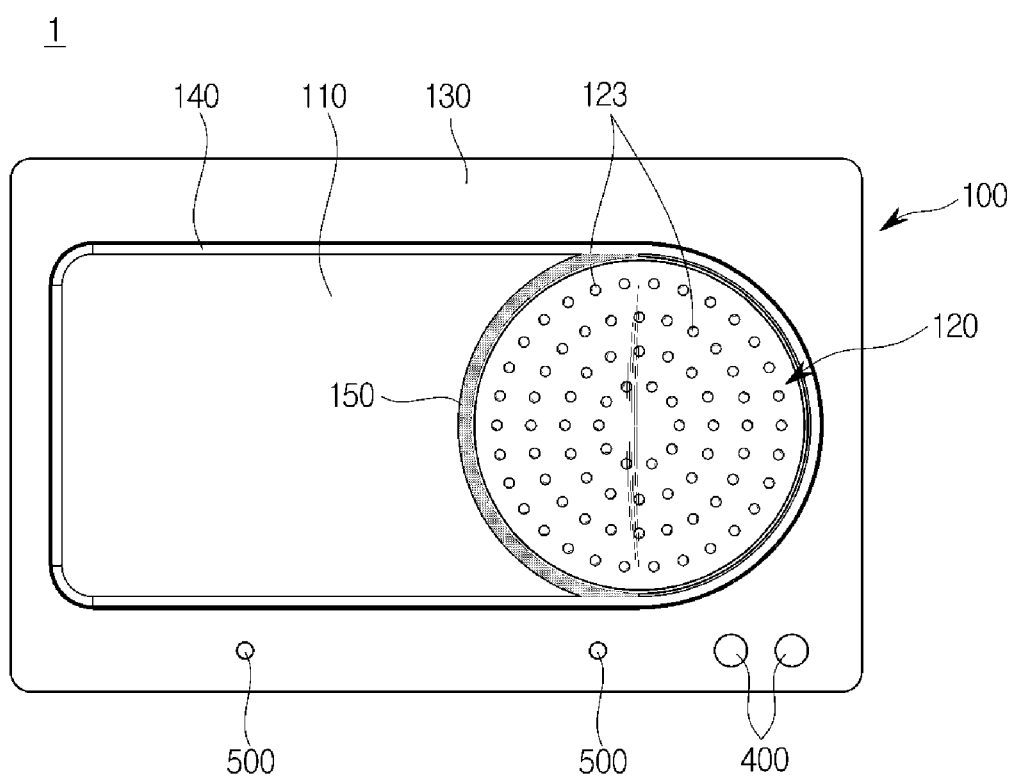
【Fig. 6b】

[Fig. 6c]
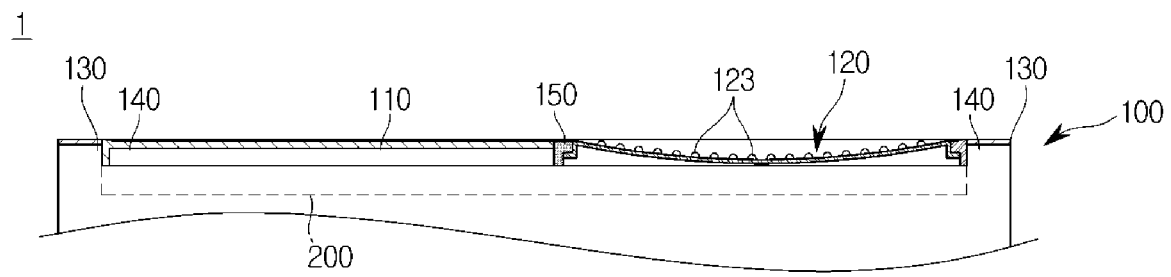

【Fig. 7a】
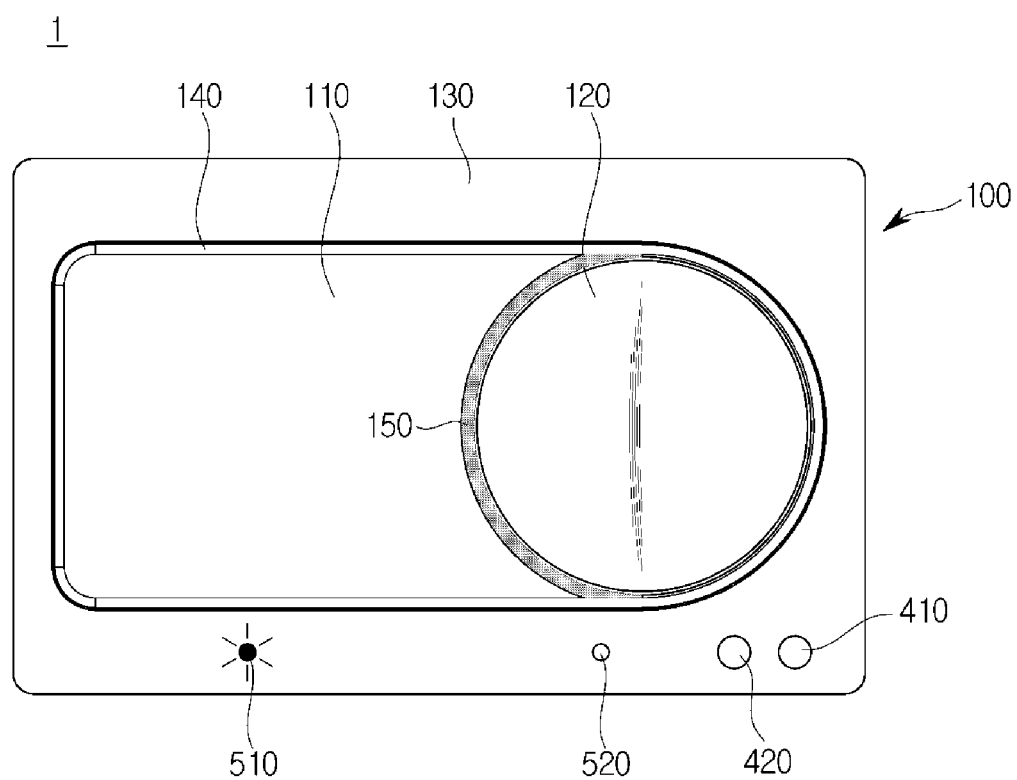

【Fig. 7b】
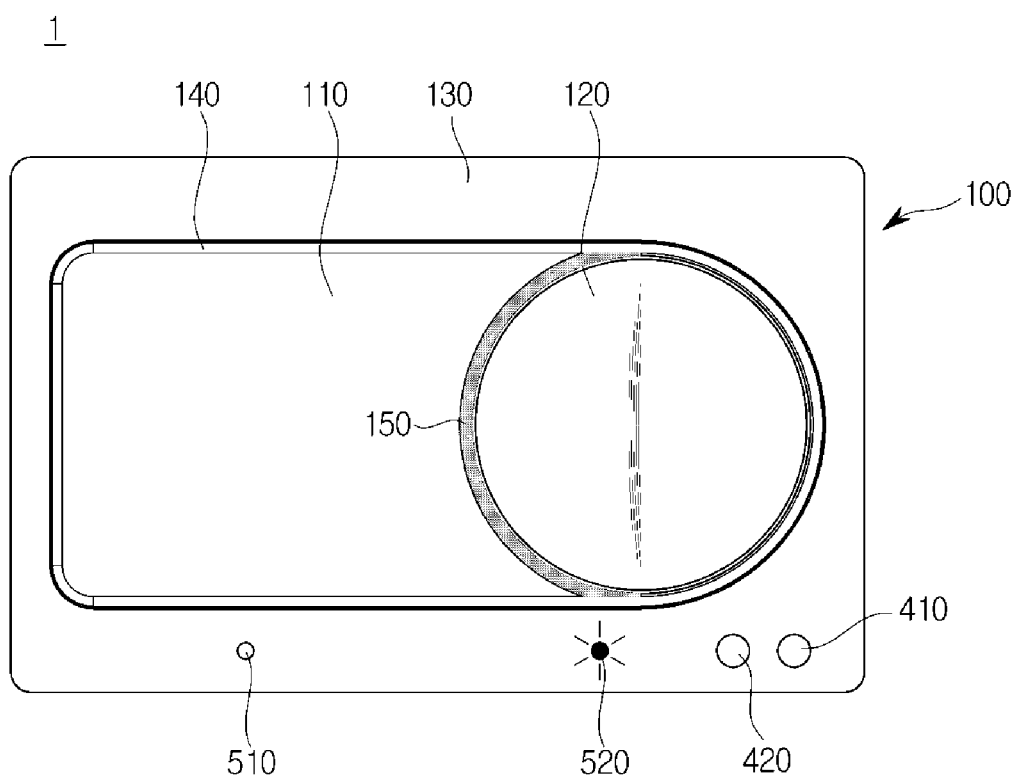

[Fig. 8a]
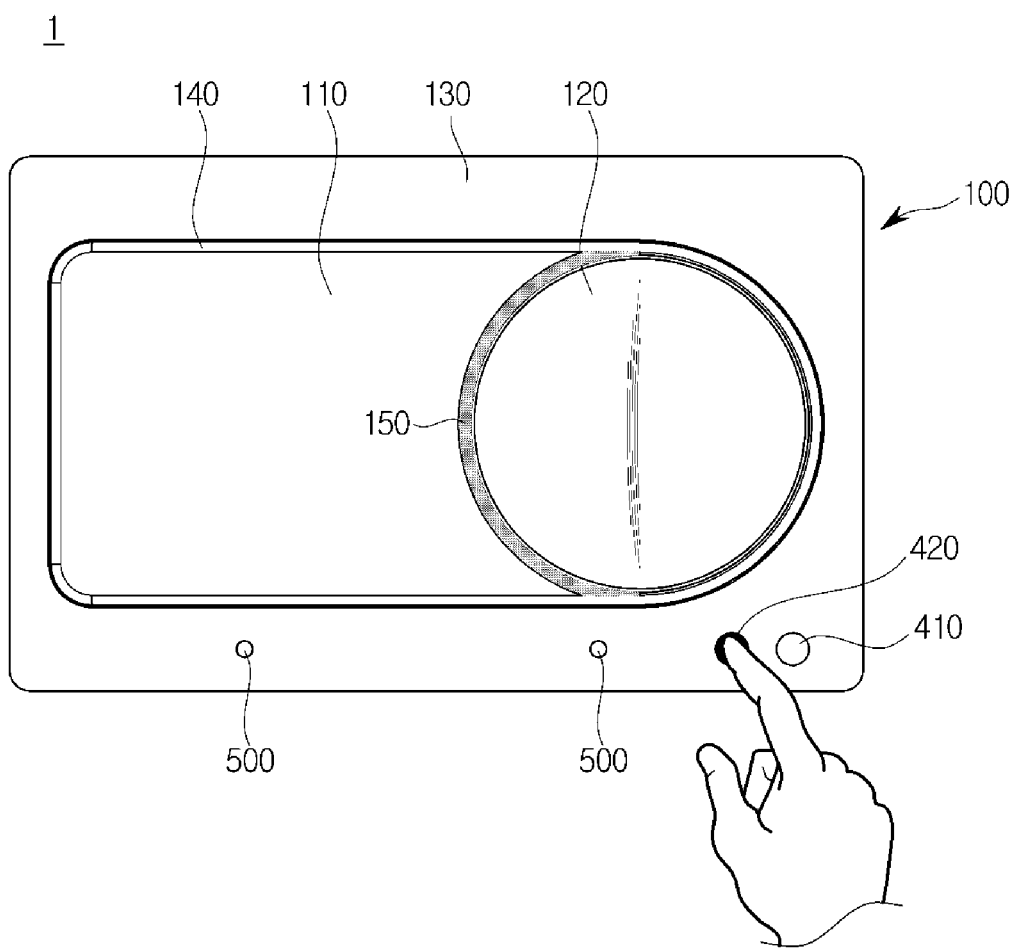

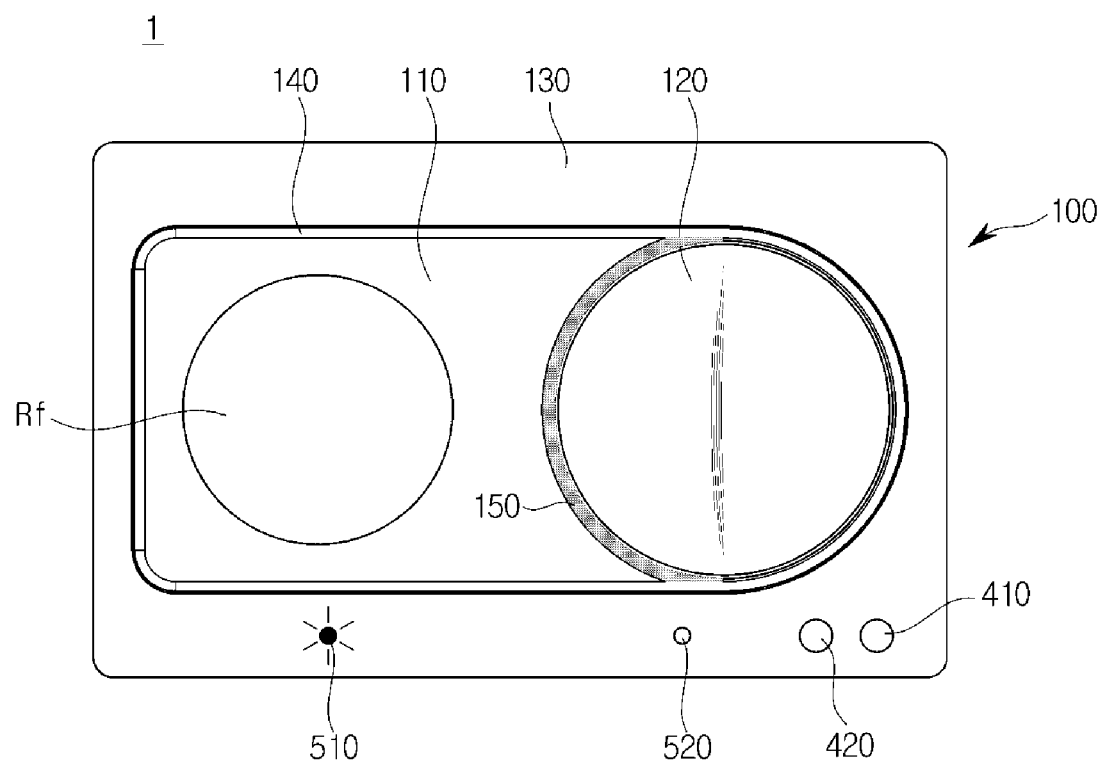
【Fig. 8b】

[Fig. 8c]
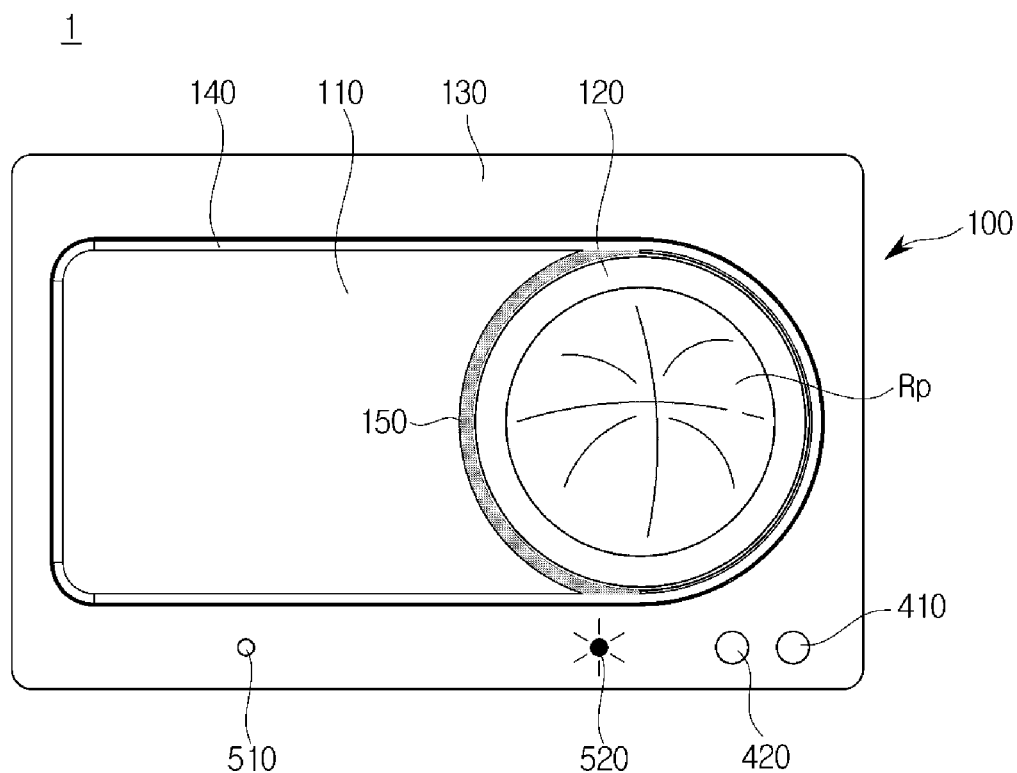

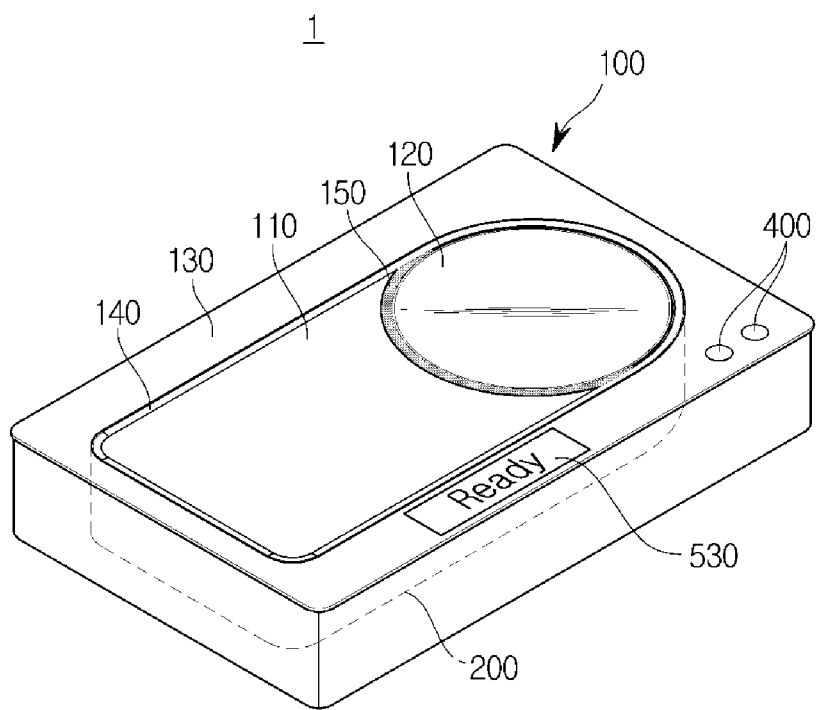
【Fig. 9a】

【Fig. 9b】
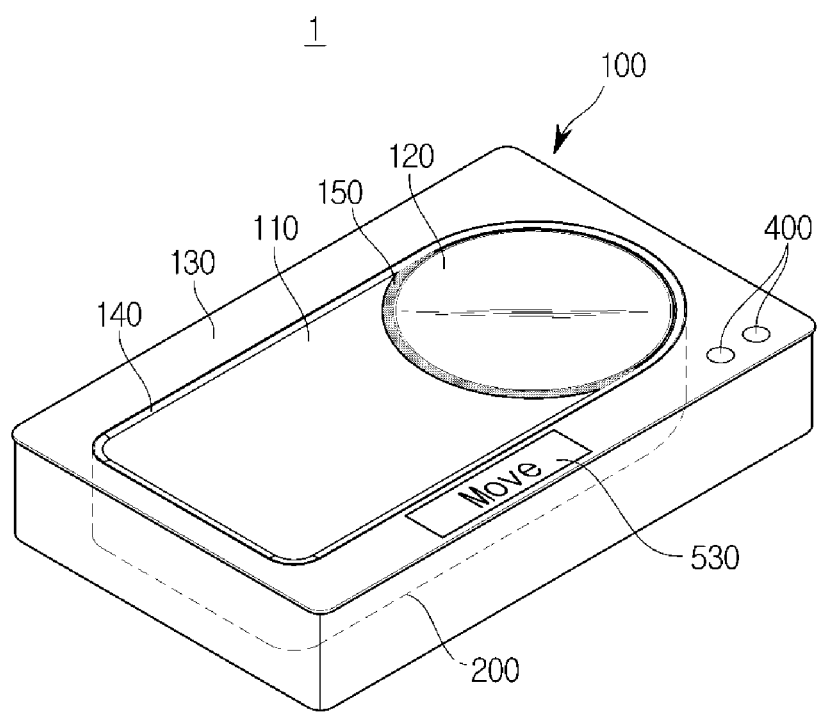

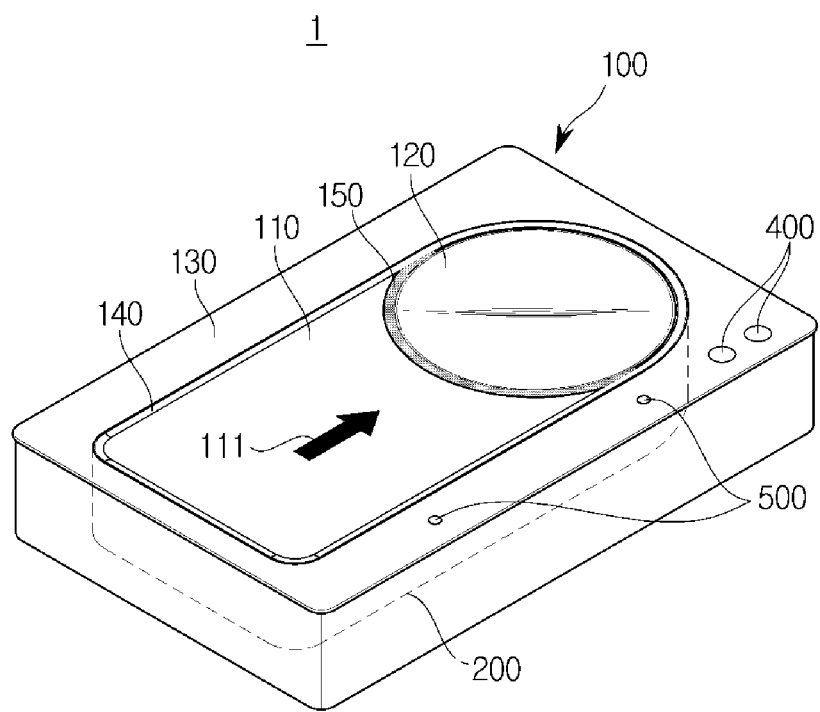
【Fig. 10a】

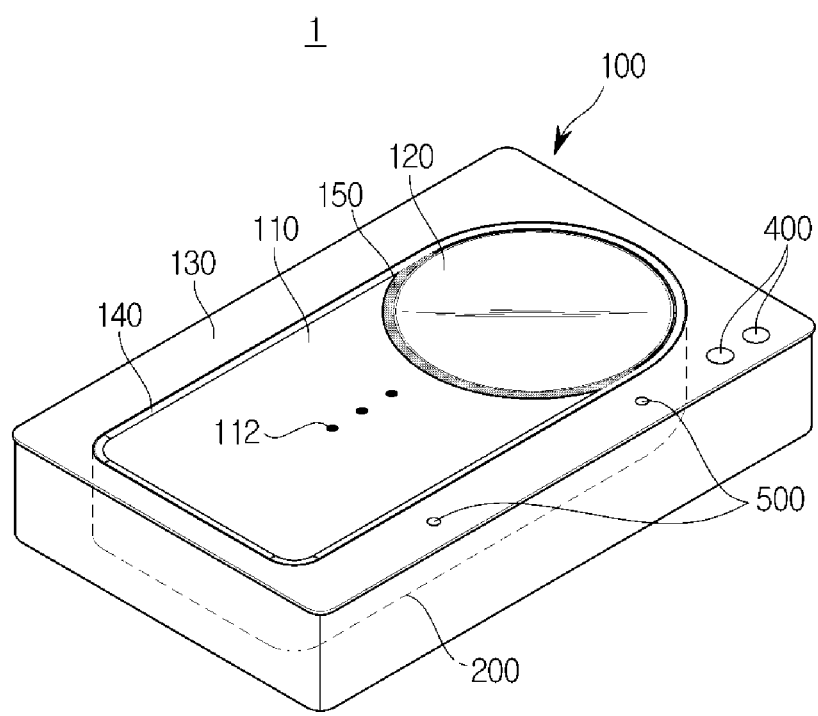
【Fig. 10b】

【Fig. 11】
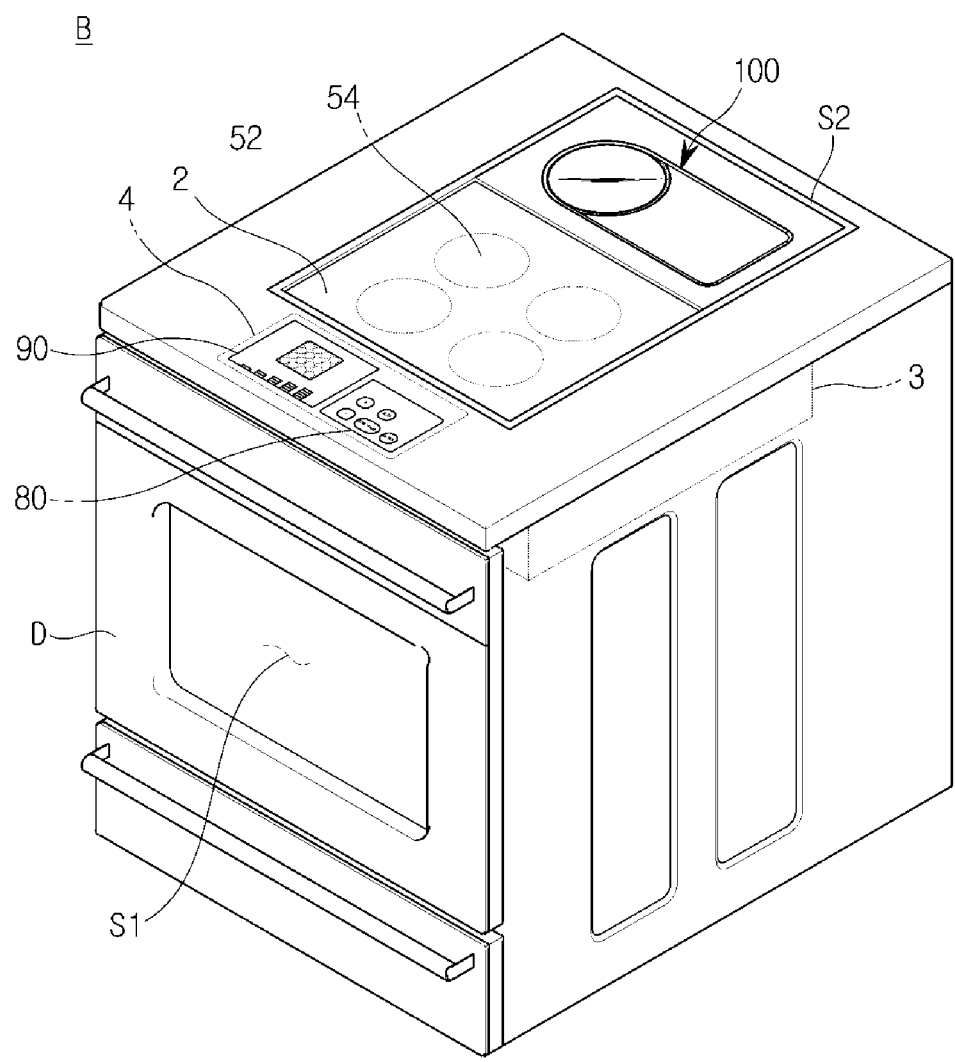

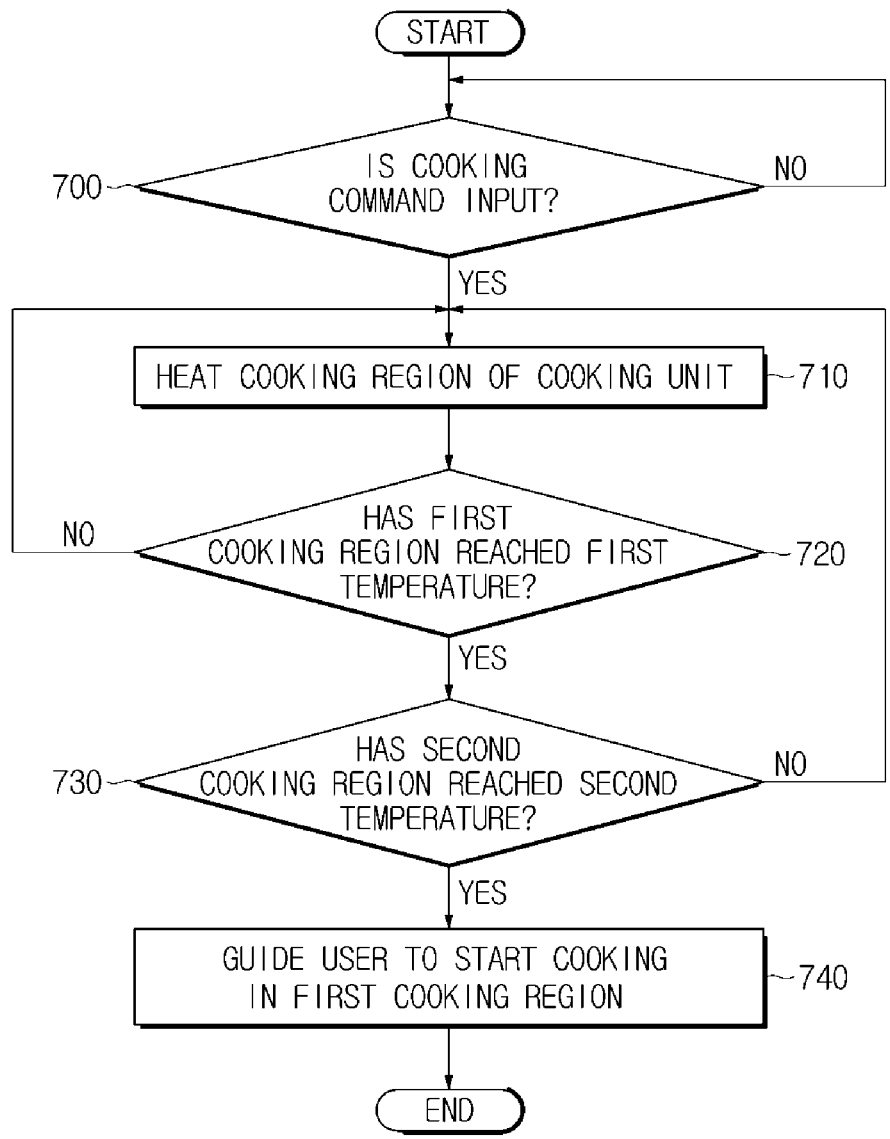
[Fig. 12]

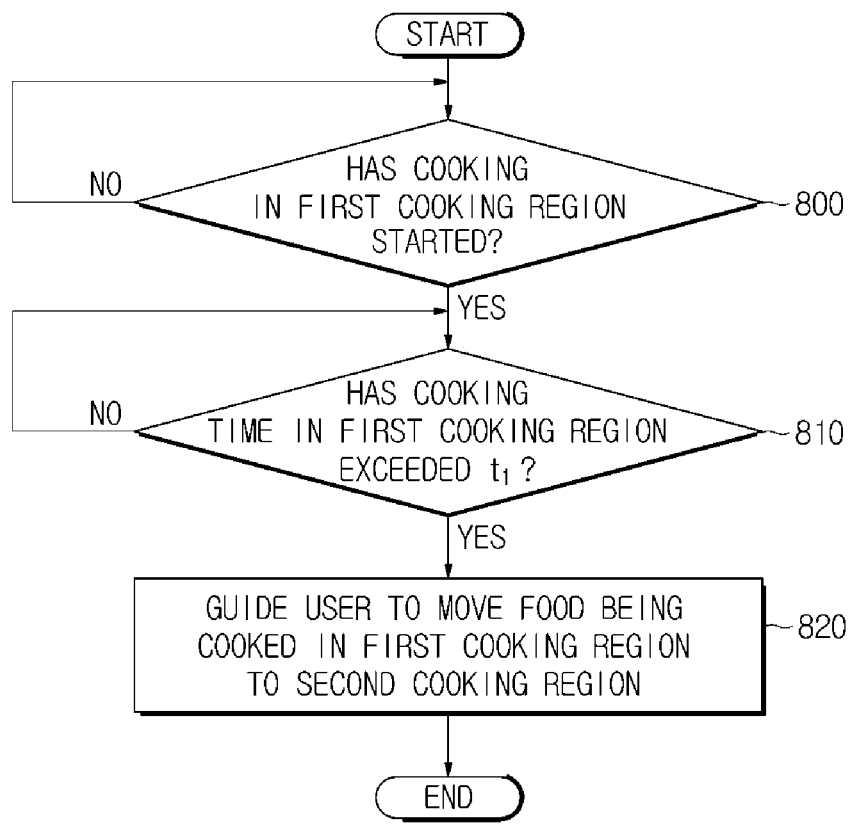
[Fig. 13]

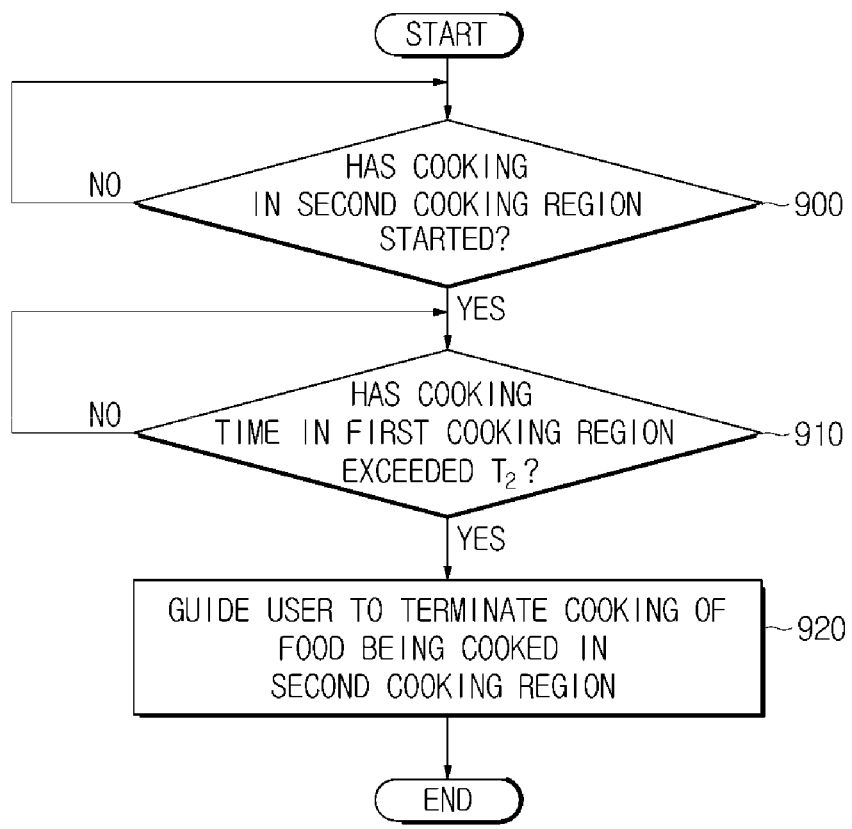
[Fig. 14]

COOKING APPARATUS AND METHOD OF CONTROLLING THE SAME

CROSS-REFERENCE TO RELATED APPLICATIONS

This application is a National Phase Application under 35 U.S.C. § 371 of PCT International Patent Application No. PCT/KR2016/012380, filed Oct. 31, 2016 which claims the foreign priority benefit under 35 U.S.C. § 119 to Korean Patent Application No. 10-2015-0156517 filed Nov. 9, 2015, the contents of which are incorporated herein by reference.

TECHNICAL FIELD

The present invention relates to a cooking apparatus for heating and cooking food, and a method of controlling the same.

BACKGROUND ART

In general, a cooking apparatus means any device that heats and cooks food. These cooking apparatuses can be distinguished according to a method of generating heat used to heat food. Specifically, the cooking apparatus can be divided into a cooking apparatus that uses heat generated by electricity so as to heat food, and a cooking apparatus that uses heat generated by burning gas so as to heat food.

Meanwhile, in recent years, cooking apparatuses according to a simple cooking method that can replace traditional cooking methods have been developed. Thus, traditional foods from all over the world can be easily cooked according to a new cooking method by using a new cooking apparatus.

For example, in India, roti is obtained by a process of baking dough and puffing the baked dough. Research on cooking apparatuses capable of simplifying the process has been actively carried out.

DISCLOSURE

Technical Problem

The present invention is directed to providing a cooking device and a control method thereof for heating a curved area to a higher temperature than a flat area of a cooking area where food is cooked.

Technical Solution

One aspect of the present invention provides a cooking apparatus that heats a curved region at a higher temperature than in a planar region of a cooking region in which food is cooked, and a method of controlling the same.

One aspect of the present invention provides a cooking apparatus includes a cooking unit having one side in which a first cooking region and a second cooking region distinguished from the first cooking region are provided; a heating unit configured to heat the cooking unit; and a controller configured to control the heating unit to heat the first cooking region to a first temperature and to heat the second cooking region to a second temperature different from the first temperature.

The second cooking region includes a curved surface region concave in a direction toward the heating unit, and the second cooking region comprises a curved surface region concave according to a predetermined curvature.

The second cooking region includes a curved surface region concave in a direction toward the heating unit, and the second cooking region is divided into a central portion of a planar region and an outer periphery portion of the curved surface region surrounding the central portion.

The second cooking region is divided into a cooking region having the one side including the first cooking region and the second cooking region, and a non-cooking region surrounding the cooking region.

The cooking unit is provided such that the cooking region and the non-cooking region have step differences on the one side.

The cooking unit is provided such that the cooking region is separable from the non-cooking region.

The cooking apparatus further includes an output unit configured to guide a cooking method corresponding to a state of the cooking apparatus, wherein the controller controls the output unit to guide a user to start cooking in the first cooking region when the first cooking region reaches the first temperature.

The cooking apparatus further includes an output unit configured to guide a cooking method corresponding to a state of the cooking apparatus, wherein the controller controls the output unit to guide a user to move food being cooked in the first cooking region to the second cooking region when a cooking time in the first cooking region has exceeded a predetermined first time.

The cooking apparatus further includes an output unit configured to guide a cooking method corresponding to a state of the cooking apparatus, wherein the controller controls the output unit to guide a user to terminate cooking of food being cooked in the second cooking region when a cooking time in the second cooking region has exceeded a predetermined second time.

Another aspect of the present invention provides a method of controlling a cooking apparatus, the cooking apparatus including: a main body; a first cooking space provided inside the main body; and a second cooking space provided outside the main body, the second cooking space including a first cooking region and a second cooking region distinguished from the first cooking region, which are provided on a top surface of the main body, the method includes receiving a cooking command; and heating the first cooking region to a first temperature and heating the second cooking region to a second temperature different from the first temperature according to the received cooking command.

The method further includes guiding a cooking method corresponding to a state of the cooking apparatus.

The guiding of the cooking method includes, when the first cooking region reaches the first temperature, guiding to start cooking in the first cooking region.

The guiding of the cooking method includes, when a cooking time in the first cooking region has exceeded a predetermined first time, guiding a user to move food being cooked in the first cooking region to the second cooking region.

The guiding of the cooking method includes, when a cooking time in the second cooking region has exceeded a predetermined second time, guiding a user to terminate cooking of food being cooked in the second cooking region.

The guiding of the cooking method comprises outputting a signal corresponding to the cooking method to be guided.

Advantageous Effects

According to one aspect of a cooking apparatus and a method of controlling the same, a cooking environment in which an inside of food of which surface is cooked in a planar region, is cooked in a curved region at a higher temperature than in the planar region, can be provided.

In particular, when roti as a traditional food of India is cooked, a curved surface region in which roti having a shape of dough of which surface is baked, can be puffed, is provided so that a user can easily cook roti.

DESCRIPTION OF DRAWINGS

FIG. 1 is a control block diagram of a cooking apparatus according to an embodiment.

FIG. 2A is a perspective view of the cooking apparatus according to an embodiment, FIG. 2B is a plan view of the cooking apparatus according to an embodiment, and FIG. 2C is a cross-sectional view taken along a line X-X' of the cooking apparatus according to an embodiment.

FIGS. 3A and 3B are views illustrating a cooking process of roti in the cooking apparatus according to an embodiment.

FIG. 4A is a perspective view of a cooking apparatus according to another embodiment, FIG. 4B is a plan view of the cooking apparatus according to another embodiment, and FIG. 4C is a cross-sectional view taken along a line X-X' of the cooking apparatus according to another embodiment.

FIG. 5A is a perspective view of a cooking apparatus according to still another embodiment, and FIG. 5B is a plan view of the cooking apparatus according to still another embodiment.

FIG. 6A is a perspective view of a cooking apparatus according to yet another embodiment, FIG. 6B is a plan view of the cooking apparatus according to yet another embodiment, and FIG. 6C is a cross-sectional view of the cooking apparatus according to yet another embodiment.

FIGS. 7A and 7B illustrate the case where the input unit 400 includes two buttons.

FIGS. 8A to 8C illustrate an operation of an output unit implemented with an LED of a cooking apparatus according to one embodiment. For convenience of explanation, in FIGS. 8A to 8C, the case where roti is cooked, will be described.

FIGS. 9A and 9B are views for explaining an operation of the output unit implemented with a shape of a display of the cooking apparatus according to another embodiment.

FIGS. 10A and 10B are views for explaining several embodiments of a position guide mark of a second cooking region of the cooking apparatus according to an embodiment.

FIG. 11 is a perspective view of a cooking apparatus including a plurality of cooking spaces according to an embodiment.

FIG. 12 is a flowchart of a method of controlling a cooking apparatus according to an embodiment.

FIG. 13 is a flowchart of a method of controlling a cooking apparatus according to another embodiment.

FIG. 14 is a flowchart of a method of controlling a cooking apparatus according to still another embodiment.

MODES OF THE INVENTION

Hereinafter, a cooking apparatus 1 and a method of controlling the same will be described in detail with reference to the accompanying drawings.

FIG. 1 is a control block diagram of a cooking apparatus according to an embodiment, FIG. 2A is a perspective view of the cooking apparatus according to an embodiment, FIG. 2B is a plan view of the cooking apparatus according to an embodiment, and FIG. 2C is a cross-sectional view taken along a line X-X' of the cooking apparatus according to an embodiment.

Referring to FIG. 1, a cooking apparatus 1 according to an embodiment may include a cooking unit 100 provided with a cooking region in which food is placed; a temperature sensor 650 for sensing a temperature of the cooking unit 100; a heating unit 200 for heating the cooking region so that the placed food is cooked; an input unit 400 for receiving a user's control command; a storage unit 600 for storing data used to control the cooking apparatus 1 in advance; an output unit 500 for outputting information about the cooking apparatus 1; and a controller 300 for controlling each of elements of the cooking apparatus 1.

The heating unit 200 may be provided at a lower end of the cooking unit 100 to heat the cooking region of the cooking unit 100 that will be described later. To this end, the heating unit 200 may be implemented to adopt at least one of a plurality of heating methods for heating the cooking region so as to be able to follow the adopted method.

The heating unit 200 according to one embodiment may heat the cooking region by burning gas supplied from the outside. Specifically, the heating unit 200 according to one embodiment may include a gas supply unit for regulating the supply of gas supplied from the outside and a gas burner that generates a flame by burning the gas. The gas supply unit may be implemented in a shape of a valve and may be opened or closed in accordance with the user's operation or control of the controller 300 to be described later. When the gas supply unit is opened, the gas may be supplied from the outside, and the gas burner may generate a high-temperature flame by burning the supplied gas. This generated flame may directly or indirectly heat the cooking region of the cooking unit 100.

The heating unit 200 according to another embodiment may heat the cooking region by generating heat by electricity supplied from the outside.

For example, the heating unit 200 may heat a heating element made of a nichrome wire using electricity and may heat the cooking region directly through far-infrared rays generated from the heated heating element. The cooking apparatus 1 adopting such a heating unit 200 is referred to as a highlighted electric range.

On the other hand, the heating unit 200 may form a magnetic field in a coil using electricity and may heat the cooking region magnetized through the formed magnetic field. The cooking apparatus 1 adopting such a heating unit 200 is referred to as an induction electric range.

Further, the heating unit 200 may heat a heating wire using electricity, and the heated heating wire heats an upper plate made of cast iron or a coated hot plate, thereby heating the cooking region at an upper side of the upper plate. The cooking apparatus 1 adopting such a heating unit 200 is referred to as a hot plate.

In addition, the heating unit 200 may heat a halogen lamp by electric power supply and may heat the cooking region using the far-infrared rays generated from the halogen lamp. The cooking apparatus 1 adopting such a heating unit 200 is referred to as a halogen electric range.

In addition to the above-described embodiments, the heating unit 200 may heat the cooking region by adopting various methods. Also, the cooking unit 100 may be implemented to heat the cooking region by adopting one or a plurality of the above-described methods.

The cooking unit 100 may be provided on one side of the cooking apparatus 1. For example, the cooking unit 100 may be provided on a top surface of the cooking apparatus 1 so that cooking of the food in the cooking unit 100 can be facilitated. Here, the top surface may refer to a surface of the cooking apparatus 1 facing a bottom surface of the cooking apparatus 1 which fixes the position of the cooking apparatus 1 in contact with the ground or a specific object.

The cooking unit 100 may include a cooking region heated by the heating unit 200. To this end, the cooking unit 100 may be provided on an upper side of the heating unit 200. For example, the cooking region of the cooking unit 100 may be provided on the upper side of the heating unit 200, and the cooking region may be directly or indirectly in contact with the heating unit 200 to receive heat from the heating unit 200.

The cooking region may be provided with food to be cooked. The cooking region may be provided in various shapes suitable for cooking.

Referring to FIGS. 2A to 2C, the cooking unit 100 may include the cooking region heated by the heating unit 200 so that the food can be placed and cooked, and a non-cooking region 130 formed to surround the cooking region.

The non-cooking region 130 may be formed to surround the cooking region to be heated. Thus, the user is able to perform cooking of the food in the cooking region formed inside the non-cooking region 130.

The cooking region is heated to a cooking temperature by the heating unit 200, whereas the non-cooking region 130 may not be heated because it is independent of cooking. In addition, in order to block heat conduction from the heated cooking region, the non-cooking region 130 may be formed of a material having a low thermal conductivity. Thus, the user's safety can be achieved.

The cooking region may be heated by the heating unit 200, and the heated cooking region may transfer heat to the food. To this end, the cooking region may be made of a material that may be easily heated by the heating unit 200. When the heating unit 200 directly heats the cooking region, the heating unit 200 may be made of a material having a high thermal conductivity such as aluminum. Also, when the heating unit 200 forms a magnetic field and indirectly heats the cooking region, the heating unit 200 may also be made of a magnetic material.

The cooking region may include a first cooking region 110 including a planar region, and a second cooking region 120 including a curved surface region extending from the first cooking region 110.

Referring to FIGS. 2A to 2C, the first cooking region 110 may be provided to occupy a wide area of the top surface of the cooking apparatus. Because the surface of the food in contact with the first cooking region 110 may be heated, the first cooking region 110 having the wide-area planar region may be advantageous for cooking surfaces of planar foodstuffs.

In addition, the second cooking region 120 may include the curved surface region extending from the planar region of the first cooking region 110. At this time, the second cooking region 120 may be provided in a concave form in a direction toward the heating unit 200. Because the cooking region of the cooking unit 100 may be provided on the upper side of the heating unit 200, the second cooking region 120 may have a concave shape downward compared to the first cooking region 110, as illustrated in FIG. 2C.

As a result, the second cooking region 120 having a curved surface region may be advantageous to cook food having a curved surface shape. Also, when the food is heated in the second cooking region 120 having a concave shape, heat may be concentrated on the food contained in the concave shape. Thus, it may be possible to heat the food at a high temperature.

As such, the cooking unit 100 includes cooking regions having different shapes so that the user can apply a plurality of cooking methods by varying the cooking regions for a single food. For example, the user may perform cooking in the first cooking region 110 so as to heat the surfaces of the planar foodstuffs and then may perform cooking in the second cooking region 120 so as to cook the inside of the food of which surface is cooked.

In particular, the cooking apparatus 1 including the cooking unit 100 according to the disclosed embodiment may be used to cook roti as Indian traditional food. Here, roti refers to baked bread after making dough round and thin and may include chapati, nan, puri, and variants thereof.

According to a traditional Roti cooking method, a flour dough is made thin and wide and is placed on an iron plate such as a tawa, and the iron plate is put in a tandoor as a traditional Indian oven so as to heat the flour dough, thereby cooking the roti.

Recently, methods of making roti by heating a tawa on which the flour dough is placed, in place of a tandoor in a gas range or an electric range, have been widely used.

In this case, a two-step cooking method can be applied to heat the flour dough. First, thin and wide flat flour dough can be heated at a low temperature (about 220° C.) (Step 1). As a result, a surface of the flour dough can be cooked. Then, the flour dough can be heated at a high temperature (about 270 to 280° C.) (Step 2). The inside of the flour dough contains moisture. At a high temperature, moisture of the inside of the flour dough is evaporated in a short time so that the flour dough may become swollen. This is called puffing, and roti can be completed by cooking the inside of the flour dough through puffing.

The cooking apparatus 1 according to the disclosed embodiment may provide a cooking environment in which cooking of Step 1 can be performed in the first cooking region 110, and may provide a cooking environment in which cooking of Step 2 can be performed in the second cooking region 120. As a result, the user may cook roti using the cooking apparatus 1 according to the disclosed embodiment.

To this end, the controller 300 may control the heating unit 200 so as to heat the first cooking region 110 to a predetermined first temperature and to heat the second cooking region 120 to a second temperature higher than the first temperature. To this end, the controller 300 may also be implemented with software that operates on a processor.

In addition, the temperature sensor 650 may sense a temperature of the cooking unit 100, specifically, the first cooking region 110 and the second cooking region 120 and may transmit the sensed temperature to the controller 300. The controller 300 may control the heating unit 200 so that each of the first cooking region 110 and the second cooking region 120 may reach the first temperature and the second temperature, respectively, based on the temperature sensed by the temperature sensor 650.

Hereinafter, a method of controlling the heating unit 200 so as to heat a cooking region using the controller 300 will be described.

FIGS. 3A and 3B are views illustrating a cooking process of roti in the cooking apparatus according to an embodiment.

As described above, the controller 300 may control the heating unit 200 so as to heat the first cooking region 110 to the first temperature and to heat the second cooking region 120 to the second temperature higher than the first temperature.

Referring to FIG. 3A, the user may insert a thin and wide flat flour dough Rf into a planar region of the first cooking region 110. In order to cook a surface of the flour dough Rf, the controller 300 may control the heating unit 200 so that the first cooking region 110 can be maintained at the first temperature. At this time, the first temperature may be pre-determined to about 220° C. However, embodiments of the present invention are not limited thereto.

After the surface of the flour dough Rf is properly cooked, the user may move the flour dough Rf to the second cooking region 120. In order to cook the inside of the flour dough Rf moved to the second cooking region 120, the controller 300 may control the heating unit 200 so that the second cooking region 120 can be maintained at the second temperature higher than the first temperature. At this time, the second temperature may be pre-determined to about 270 to 280° C. However, embodiments of the present invention are not limited thereto.

Referring to FIG. 3B, when a high temperature is applied to the second cooking region 120, moisture of an inside of a flour dough Rp is evaporated, and gas is expanded so that the flour dough Rp may be swollen. In this way, the inside of the swollen dough Rp can be cooked by puffing. When it is determined that the inside of the flour dough Rp has been properly cooked, the user may terminate cooking, thereby completing roti.

Unlike in FIGS. 3A and 3B, the cooking apparatus 1 according to the disclosed embodiment may perform a variety of cooking of food in addition to roti. For example, the cooking apparatus 1 according to the disclosed embodiment may be used for cooking foods such as bread, pizza, and Korean pastry using dough and may be used for cooking other foods.

As described above, the cooking region may be divided into the first cooking region 110 and the second cooking region 120 that are heated at different temperatures. In particular, the first cooking region 110 and the second cooking region 120 may be distinguished from each other by an insulation unit 150. The insulation unit 150 may be provided between the first cooking region 110 and the second cooking region 120 and may block heat-exchanging between the first cooking region 110 and the second cooking region 120. To this end, the insulation unit 150 may be implemented with a material having a low thermal conductivity.

Referring back to FIGS. 2A through 2C, the first cooking region 110 of the cooking unit 100 may include a planar region horizontal with respect to a bottom surface thereof. However, in contrast to this, the planar region of the first cooking region 110 may also be formed inclined in one direction.

Also, an outer periphery of the first cooking region 110 may be parallel to an outer periphery of the non-cooking region 130. As a result, corners of the first cooking region 110 may be aligned perpendicular to each other. Referring to FIGS. 2A and 2B, three corners of the first cooking region 110 may be formed parallel to corners of the outer periphery of the non-cooking region 130 so that the user can see that each corner of the first cooking region 110 forms a right angle.

In addition, the curved surface region of the second cooking region 120 may be manufactured to have a predetermined curvature. In FIGS. 2A through 2C, the curved surface region of the second cooking region 120 has a predetermined single curvature. Alternatively, the second cooking region 120 may have a center and a periphery of the curved surface region having different curvatures. For example, the curvature of the outer periphery of the curved surface region of the second cooking region 120 may be larger than that of the center of the curved surface region of the second cooking region 120. Conversely, the curvature of the outer periphery of the curved surface region of the second cooking region 120 may be smaller than that of the center of the curved surface region of the second cooking region 120. Also, the curvature of the curved surface region of the second cooking region 120 may grow smaller or larger as it is closer to the center thereof.

The cooking unit 100 may be provided such that the cooking region and the non-cooking region 130 have step differences. Referring to FIGS. 2A to 2C, the cooking unit 100 according to an embodiment may include a stepped unit 140 that forms a step difference at a boundary between the cooking region and the non-cooking region 130. Specifically, the stepped unit 140 may form a step difference such that the cooking region is located on a lower side than the non-cooking region 130.

This allows the user to easily manipulate the food being cooked in the cooking region. For example, when, in the first cooking region 110, cooking one surface of a thin and wide dough and then cooking the opposite surface, the user may move the food to the stepped unit 140 to easily reverse the food.

Further, the cooking unit 100 may be provided so that the cooking region thereof can be separated from the non-cooking region 130. Because the actual food is cooked in the cooking region, hygiene of the cooking region is important. When the cooking region is separated from the non-cooking region 130, the cooking region can be easily cleaned, thereby providing a more hygienic cooking environment to the user.

Up to now, the cooking apparatus 1 including the cooking unit 100 having the shapes disclosed in FIGS. 2A to 2C and FIGS. 3A and 3C has been described. However, in addition to the disclosed shapes, the cooking apparatus 1 may include a cooking unit 100 having various shapes.

FIG. 4A is a perspective view of a cooking apparatus according to another embodiment, FIG. 4B is a plan view of the cooking apparatus according to another embodiment, and FIG. 4C is a cross-sectional view taken along a line X-X' of the cooking apparatus according to another embodiment.

FIGS. 4A to 4C illustrate a cooking apparatus 1 having only a different second cooking region 120 from that of the cooking apparatus 1 illustrated in FIGS. 2A to 2C. Thus, hereinafter, the cooking apparatus 1 of FIGS. 4A to 4C will be described based on the difference between the cooking apparatus 1 of FIGS. 4A to 4C and the cooking apparatus 1 of FIGS. 2A to 2C.

The second cooking region 120 of the cooking apparatus 1 of FIGS. 2A to 2C includes a curved surface region having a predetermined curvature. On the other hand, the second cooking region 120 may include a central portion 121 of a planar region and an outer periphery portion 122 of a curved surface region surrounding the central portion 121.

Referring to FIGS. 4A to 4C, the central portion 121 may be located at the center of the second cooking region 120 as a circular region. Here, the central portion 121 may be provided to be horizontal with respect to a bottom surface or to be inclined in one direction.

In addition, the outer periphery portion 122 refers to a region surrounding the central portion 121, and this region may have a predetermined curvature. At this time, the outer periphery portion 122 may have one curvature. Alternatively, it may have a curvature that varies continuously or discontinuously depending on a position.

In this way, when the second cooking region 120 is divided into the central portion 121 and the outer periphery portion 122, it may be advantageous to cook food having a relatively wide shape.

Further, the cooking apparatus 1 may include a first cooking region 110 having a different shape from that shown in FIGS. 2A to 2C and FIGS. 3A and 3C.

FIG. 5A is a perspective view of a cooking apparatus according to still another embodiment, and FIG. 5B is a plan view of the cooking apparatus according to still another embodiment.

FIGS. 5A and 5B illustrate a cooking apparatus 1 having only a different first cooking region 110 from that of the cooking apparatus 1 illustrated in FIGS. 2A to 2C. Thus, hereinafter, the cooking apparatus 1 of FIGS. 5A and 5B will be described based on the difference between the cooking apparatus 1 of FIGS. 5A and 5B and the cooking apparatus 1 of FIGS. 2A to 2C.

Corners of the first cooking region 110 of the cooking apparatus 1 of FIGS. 2A to 2C are aligned perpendicular to each other. Unlike this, the corners of the first cooking region 110 may also be formed to have curved shapes.

Referring to FIGS. 5A and 5B, it can be confirmed that there is a portion where the outer periphery of the first cooking region 110 is not parallel to the outer periphery of the non-cooking region 130. That is, a portion of the outer periphery of the first cooking region 110 may have a curved shape according to a predetermined curvature.

However, since the case of FIGS. 5A and 5B is only an embodiment of the first cooking region 110, the first cooking region 110 may be implemented with various shapes within a technical feature including a planar region.

Also, the cooking unit 100 may have at least one protrusion 123 in the second cooking region 120 of one surface of the cooking unit 100.

FIG. 6A is a perspective view of a cooking apparatus according to yet another embodiment, FIG. 6B is a plan view of the cooking apparatus according to yet another embodiment, and FIG. 6C is a cross-sectional view of the cooking apparatus according to yet another embodiment.

As described above, the second cooking region 120 of the cooking unit 100 may be provided in a concave shape. At this time, at least one protrusion 123 protruding in an opposite direction to a concave direction may be provided on the surface of the second cooking region 120.

Referring to FIGS. 6A to 6C, the second cooking region 120 may be concave at a lower side of the cooking apparatus 1, whereas the at least one protrusion 123 may protrude to the lower side of the cooking apparatus 1 and may be formed on the surface of the second cooking region 120.

The at least one protrusion 123 formed in the second cooking region 120 may prevent food from sticking to the second cooking region 120 and may prevent the food from being excessively cooked due to a high temperature of the second cooking region 120.

Referring back to FIG. 1, the input unit 400 may receive a control command from a user, and the output unit 500 may output information relating to a state of the cooking apparatus 1 to the user. Hereinafter, operations of the input unit 400 and the output unit 500 will be described with reference to FIGS. 7A and 7B.

FIGS. 7A and 7B are views for explaining an input unit and an output unit of the cooking apparatus according to an embodiment.

The input unit 400 may be implemented with various shapes on the surface of the cooking apparatus 1. For example, the input unit 400 may receive a control command through the user's pressure. Alternatively, the input unit 400 may be implemented as a touch screen and may receive a control command through the user's touch.

In FIGS. 7A and 7B, the input unit 400 is implemented as a button on a surface on which the cooking unit 100 is formed. In particular, the input unit 400 may include a first button 410 for receiving a power on/off command; and a second button 420 for receiving a cooking command.

The control command input through the input unit 400 may be transmitted to the controller 300, and the controller 300 may control each element of the cooking apparatus 1 in accordance with the control command.

For example, when the first button 410 is pressed, the controller 300 may turn on/off power of the cooking apparatus 1. Also, when the second button 420 is pressed, the controller 300 may control the heating unit 200 to heat the cooking region of the cooking unit 100.

FIGS. 7A and 7B illustrate the case where the input unit 400 includes two buttons. However, there is no limitation to the number of buttons included.

The output unit 500 may output information relating to the state of the cooking apparatus 1 and may provide the information to the user. To this end, the output unit 500 may output the information relating to the state of the cooking apparatus 1 using various methods. For example, the output unit 500 may visually output the information relating to the state of the cooking apparatus 1. Alternatively, the output unit 500 may audibly or tactually output the information relating to the state of the cooking apparatus 1.

In FIGS. 7A and 7B, the output unit 500 is implemented as a shape of a light-emitting diode (LED) on the surface on which the cooking unit 100 is formed, and outputs information visually. Especially, the output unit 500 may include a first LED 510; and a second LED 520, which output different information.

The controller 300 may control the output unit 500 so as to turn on an LED corresponding to information to be output in a pattern corresponding to the information to be output. When the information to be output corresponds to turning on of the first LED 510, the controller 300 may turn on the first LED 510, as illustrated in FIG. 7A. In contrast, when the information to be output corresponds to turning on of the second LED 520, the controller 300 may turn on the second LED 520.

In FIGS. 7A and 7B, the output unit 500 includes two LEDs. However, the number of LEDs included is not limited.

The information output by the output unit 500 may include a cooking method corresponding to the state of the cooking apparatus 1. Hereinafter, an operation of the output unit 500 will be described with reference to FIGS. 8A to 8C.

FIGS. 8A to 8C illustrate an operation of an output unit implemented with an LED of a cooking apparatus according to one embodiment. For convenience of explanation, in FIGS. 8A to 8C, the case where roti is cooked, will be described.

When the user presses the second button 420, as illustrated in FIG. 8A, the input unit 40 may receive a cooking command and may transmit the cooking command to the controller 300. In accordance with the cooking command, the controller 300 may control the heating unit 200 to heat the first cooking region 110 of the cooking unit 100 to a predetermined first temperature and may heat the second cooking region 120 to a second temperature higher than the first temperature.

When the first cooking region 110 reaches the predetermined first temperature, the controller 300 may control the output unit 500 to guide the user to start cooking in the first cooking region 110. Specifically, as shown in FIG. 8B, the controller 300 may turn on the first LED 510, thereby guiding the user to start cooking in the first cooking region 110. When the first LED 510 is turned on, the user may visually confirm that the first LED 510 is turned on, and then may start cooking by placing the flour dough Rf in a thin and wide shape.

When a predetermined first time elapses after the cooking has started in the first cooking region 110, the controller 300 may control the output unit 500 to guide the user to move the food being cooked in the first cooking region 110 to the second cooking region 120. Specifically, as shown in FIG. 8C, the controller 300 turns on the second LED 520, thereby guiding the user to move the food being cooked in the first cooking region 110 to the second cooking region 120. When the second LED 520 is turned on, the user may confirm visually that the second LED 520 is turned on, and then may move the flour dough cooked in the first cooking region 110 to the second cooking region 120. As a result, the flour dough Rp swollen in the second cooking region 120 may be obtained.

In FIGS. 8A to 8C, the output unit 500 outputs guide of start of cooking in the first cooking region 110 and guide of movement to the second cooking region 120. However, besides, the output unit 500 may output guide of various cooking methods. For example, when a cooking time in the second cooking region 120 has exceeded a predetermined second time, the output unit 500 may guide a user to terminate the cooking of the food being cooked in the second cooking region 120. In detail, the second LED 520 may output a light pattern for ending the cooking of the food being cooked in the second cooking region 120. Here, the light pattern may include color of light output from the LED, blinking, and the like. The user who verifies it visually may terminate the cooking of the food placed in the second cooking region 120, thereby completing roti.

Furthermore, when the cooking time in the first cooking region 110 has exceeded a predetermined third time, the output unit 500 may output a light pattern guiding the user to reverse food placed in the first cooking region 110. Here, the light pattern may include color of light output from the LED, blinking, and the like. The user who verifies it visually may reverse the food placed in the first cooking region 110, thereby performing the cooking continuously.

In this case, the cooking time in the first cooking region 110 or the second cooking region 120 may be measured using various methods. For example, pressure applied to the first cooking region 110 or the second cooking region 120 may be measured, or the input unit 400 may receive a command indicating start of cooking.

In FIGS. 8A to 8C, the output unit 500 includes the first LED 510 and the second LED 520. Unlike this, the output unit 500 may be implemented with a display and may display guide of a cooking method.

FIGS. 9A and 9B are views for explaining an operation of the output unit implemented with a shape of a display of the cooking apparatus according to another embodiment.

When the first cooking region 110 reaches the predetermined first temperature, the controller 300 may control the output unit 500 so as to guide the user to start cooking in the first cooking region 110. Specifically, as illustrated in FIG. 9A, the controller 300 may control the output unit 500 to output "Ready", thereby guiding start of cooking in the first cooking region 110. When "Ready" is output by the output unit 500, the user may confirm it visually and then may start cooking by placing the flour dough having a thin and wide shape in the first cooking region 110.

When the predetermined first time elapses after the cooking starts in the first cooking region 110, the controller 300 may control the output unit 500 to guide the user to move the food being cooked in the first cooking region 110 to the second cooking region 120. Specifically, as shown in FIG. 9B, the controller 300 may control the output unit 500 to output "Move", thereby guiding the food being cooked in the first cooking region 110 to move to the second cooking region 120. When "Move" is output by the output unit 500, the user may confirm it visually and then may move the flour dough cooked in the first cooking region 110 to the second cooking region 120, thereby puffing the flour dough.

Meanwhile, the first cooking region 110 of the cooking unit 100 may be provided to display a mark for guiding a position where the second cooking region 120 is located.

FIGS. 10A and 10B are views for explaining several embodiments of a position guide mark of a second cooking region of the cooking apparatus according to an embodiment.

As described above, the curved surface region of the second cooking region 120 may extend from the planar region of the first cooking region 110. Since the user cooks the food by continuously moving the food cooked in the first cooking region 110 to the second cooking region 120, the user may recognize a direction in which the food is moved, using the position guide mark of the second cooking region 120.

The position guide mark may be provided on the surface of the first cooking region 110. FIG. 10A illustrates a case where a position guide mark 111 is provided in an arrow shape, and FIG. 10B illustrates a case where a position guide mark is provided as a set 112 of points arranged at regular intervals in a direction toward the second cooking region 120.

Such a position guide mark may be printed in advance on the surface of the first cooking region 110 during manufacturing.

Referring back to FIG. 1, the storage unit 600 may store various types of information used by the controller 300 to control the cooking apparatus, in advance. For example, the storage unit 600 may store information such as the above-described first temperature and second temperature, the first time, the second time, and the third time in advance and may provide the information to the controller 300.
when necessary.

To this end, the storage unit 600 may be implemented with at least one type selected from the group consisting of a flash memory type, a hard disk type, a multimedia card micro type, a card type memory (e.g., secure-digital (SD) or eXtreme-digital (XD) memory), a random access memory (RAM), a static random access memory (SRAM), a read only memory (ROM), an electrically erasable programmable read only memory (EEPROM), a programmable read only memory (PROM), a magnetic memory, a magnetic disk, and an optical disk.

Up to now, the cooking apparatus 1 including a single cooking space formed by the cooking unit 100 has been described. Alternatively, the cooking apparatus, which includes a plurality of cooking spaces and in which a first cooking region 110 and a second cooking region 120 are separately provided in any one of the plurality of cooking spaces that are heated to different temperatures.

FIG. 11 is a perspective view of a cooking apparatus including a plurality of cooking spaces according to an embodiment.

The cooking apparatus disclosed in FIG. 11 may have a main body B. The main body B has an interior, first cooking space S1 and an exterior, second cooking space S2.

The first cooking space S1 can be opened and closed by a door D provided on one side of the main body B. Specifically, when the user puts food into the first cooking space S1 from the outside, the first cooking space S1 can be opened by the door D. Also, in order to start the cooking for the placed food, the first cooking space S1 can be closed by the door D.

In the first cooking space S1, the placed food can be cooked by adopting at least one of known cooking methods.

A second cooking space S2 may be provided on one side of an outside of the main body B. FIG. 11 illustrates a case where the second cooking space S2 is provided on an upper portion of the main body B.

A cooking plate 2 on which a cooking container can be placed, may be installed in the second cooking space S2. The cooking plate 2 may be made of a ceramic material. A plurality of coils 54 for providing heat to the cooking container placed on the cooking plate may be provided on the bottom of the cooking plate 2.

Also, a coil driver 3 for driving the coils 54 may be disposed below the cooking plate 2.

Meanwhile, the cooking apparatus of FIG. 11 may be provided to include the cooking apparatus 1 of FIG. 1. In particular, the cooking unit 100 of FIG. 1 may be provided in the second cooking space S2 of the cooking apparatus of FIG. 11. That is, the second cooking space S2 of the cooking apparatus of FIG. 11 may include the cooking unit 100 having a cooking region divided into the first cooking region 110 and the second cooking region 120 of different temperatures, in addition to the cooking plate 2 having a bottom on which the coils 54 are provided.

A control panel 4 including an input unit 80 for receiving a control command for the cooking apparatus and a display 90 for displaying information relating to the cooking apparatus may be provided on the upper portion of the main body B.

In FIG. 11, the control panel 4 includes the input unit 400 and the output unit 500 of FIG. 1. However, an input unit 400 and an output unit 500 for inputting/outputting data to/from the cooking unit 100 provided in the second cooking space S2 may also be provided separately from the control panel 4.

In FIG. 11, an induction heating type cooking apparatus is provided together with the cooking apparatus 1 of FIG. 1. However, a cooking apparatus adopting other heating methods, such as gas, electric, induction, etc., may be provided together with the cooking apparatus 1 of FIG. 1.

FIG. 12 is a flowchart of a method of controlling a cooking apparatus according to an embodiment.

First, the controller 300 may check whether a cooking command is input through the input unit 400 (operation 700). When the cooking command is not input, the controller 30 may confirm this repeatedly.

On the other hand, when the cooking command is input, the heating unit 200 may heat a cooking region of the cooking unit 100 (operation 710). At this time, the heating unit 200 may heat the cooking region of the cooking unit 100 by adopting various methods. For example, the heating unit 200 may heat the cooking region of the cooking unit 100 by burning gas, and alternatively, the heating unit 200 may heat the cooking region of the cooking unit 100 using supplied electricity. In particular, when electricity is used, the heating unit 200 may heat the cooking region by generating heat directly or may heat the cooking region indirectly by forming an electric field.

While heating the cooking region, the controller 300 may check whether the first cooking region 110 has reached the first temperature (operation 720). When it is before the first cooking region 110 has reached the first temperature, the heating unit 200 may heat the cooking region continuously.

Alternatively, when the first cooking region 110 has reached the first temperature, the controller 300 may check whether the second cooking region 120 has reached the second temperature (operation 730). At this time, the second temperature may be pre-determined to be higher than the first temperature. When it is before the second cooking region 120 has reached the second temperature, the heating unit 200 may heat the cooking region continuously.

Alternatively, when the second cooking region 120 has reached the second temperature, the output unit 500 may guide the user to start cooking in the first cooking region 110 (operation 740). The user may start cooking by placing food in the first cooking region 110 according to a guide output by the output unit 500.

FIG. 13 is a flowchart of a method of controlling a cooking apparatus according to another embodiment.

First, the controller 300 determines whether cooking has started in the first cooking region 110 (operation 800). In order to determine whether the cooking has started, the controller 300 may use a pressure applied to the first cooking region 110. When food is placed in the first cooking region 110 and pressure is applied to the first cooking region 110, it means that the cooking has started in the first cooking region 110. Thus, the controller 300 may determine a time when pressure is applied to the first cooking region 110, as a cooking starting time. Alternatively, the user may input a command indicating a cooking starting time.

When it is before the cooking has started in the first cooking region 110, the controller 300 may confirm this repeatedly.

On the other hand, when the cooking has started in the first cooking region 110, the controller 300 may check whether the cooking time in the first cooking region 110 has exceeded a first time $t_1$ (operation 810). Here, the first time $t_1$ may mean an optimum cooking time required in the first cooking region 110 and may be stored in the storage unit 600 in advance.

When the cooking time in the first cooking region 110 has not exceeded the first time $t_1$, the controller 300 may confirm this repeatedly.

Alternatively, when the cooking time in the first cooking region 110 has exceeded the first time $t_1$, the output unit 500 may guide the user to move the food being cooked in the first cooking region 110 to the second cooking region 120 (operation 820). The user may move the food to the second cooking region 120 in accordance with a guide output by the output unit 500, thereby performing cooking of the food continuously.

FIG. 14 is a flowchart of a method of controlling a cooking apparatus according to still another embodiment.

First, the controller 300 determines whether cooking has started in the second cooking region 120 (operation 900). In order to determine whether the cooking has started, the controller 300 may use pressure applied to the second cooking region 120. When the food is placed in the second cooking region 120 and pressure is applied to the second cooking region 120, it means that the cooking has started in the second cooking region 120. Thus, the controller 300 may determine a time when pressure is applied to the second cooking region 120, as a cooking starting time. Alternatively, the user may input a command indicating a cooking starting time.

When it is before the cooking has started in the second cooking region 120, the controller 300 may confirm this repeatedly.

On the other hand, when the cooking has started in the second cooking region 120, the controller 300 may check whether the cooking time in the second cooking region 120 has exceeded a second time $t_2$ (operation 910). Here, the second time $t_2$ may means an optimum cooking time required in the second cooking region 120 and may be stored in the storage unit 600 in advance.

When the cooking time in the second cooking region 120 has not exceeded the second time $t_2$, the controller 300 may confirm this repeatedly.

Unlike this, when the cooking time in the second cooking region 120 has exceeded the second time $t_2$, the output unit 500 may guide the user to terminate cooking of the food being cooked in the second cooking region 120 (operation 920). The user may terminate cooking of the food being cooked in the second cooking region 120 in accordance with a guide output by the output unit 500, thereby completing a desired food.

The invention claimed is:

1. A cooking apparatus comprising:
    a cooker having one side in which a first cooking region and a second cooking region distinguished from the first cooking region are provided, each of the first cooking region and the second cooking region being configured to dispose food thereon in a manner of contacting with the food;
    an indicator to guide a user in cooking the food;
    a heater to heat the cooker to heat the first cooking region and the second cooking region; and
    a controller configured to
        measure a first cooking time of the food heated on the first cooking region and a second cooking time of the food heated on the second cooking region,
        control the heater to heat the first cooking region to a first temperature and to heat the second cooking region to a second temperature different from the first temperature, and
        control the indicator based on the first cooking time, the second cooking time, the first temperature and the second temperature,
    wherein the first cooking region includes a planar region and the second cooking region is provided in a concave form in a direction toward the heater so as to perform different cooking methods on the food, the second cooking region having a protrusion formed thereon, the protrusion configured to inhibit the food from sticking to the concave cooking surface.

2. The cooking apparatus of claim 1, wherein a concave cooking surface of the second region extends in a direction toward the heater according to a predetermined curvature.

3. The cooking apparatus of claim 1, wherein the second cooking region includes an outer periphery portion of a curved surface region surrounding a central portion of a planar region.

4. The cooking apparatus of claim 1 further comprising, a non-cooking region surrounding the cooking region.

5. The cooking apparatus of claim 4, wherein there is a step difference between the cooking region and the non-cooking region.

6. The cooking apparatus of claim 4, wherein the cooking region is separable from the non-cooking region.

7. The cooking apparatus of claim 1, wherein the controller controls the indicator to guide the user to start cooking in the first cooking region when the first cooking region reaches the first temperature.

8. The cooking apparatus of claim 1, wherein the controller controls the indicator to guide the user to move the food being cooked in the first cooking region to the second cooking region when the first cooking time in the first cooking region has exceeded a predetermined first time.

9. The cooking apparatus of claim 1, wherein the controller controls the indicator to guide the user to terminate cooking of the food being cooked in the second cooking region when the second cooking time in the second cooking region has exceeded a predetermined second time.

10. A method of controlling a cooking apparatus, the cooking apparatus including: a main body; a first cooking space provided inside the main body; a second cooking space provided outside the main body, the second cooking space including a first cooking region and a second cooking region distinguished from the first cooking region, which are provided on a top surface of the main body, an indicator to guide a user in cooking food, and a heater to heat the first cooking region and the second cooking region, wherein each of the first cooking region and the second cooking region being configured to dispose the food thereon in a manner of contacting with the food, and wherein the first cooking region includes a planar region and the second cooking region is provided in a concave form in a direction toward the heater so as to perform different cooking methods on the food, the second cooking region having a protrusion formed thereon, the protrusion configured to inhibit the food from sticking to the concave cooking surface, the method comprising:
    receiving a cooking command;
    heating the first cooking region to a first temperature and heating the second cooking region to a second temperature different from the first temperature according to the received cooking command;
    measuring a first cooking time of the food heated on the first cooking region and a second cooking time of the food heated on the second cooking region; and
    controlling the indicator based on the first cooking time, the second cooking time, the first temperature and the second temperature.

11. The method of claim 10, further comprising controlling the indicator to indicate a cooking method corresponding to a state of the cooking apparatus.

12. The method of claim 11, further comprising controlling the indicator to indicate to the user to start cooking in the first cooking region when the first cooking region reaches the first temperature.

13. The method of claim 11, further comprising controlling the indicator to indicate to the user to move the food being cooking in the first cooking region to the second cooking region when the first cooking time in the first cooking region has exceeded a predetermined first time.

14. The method of claim 11, further comprising controlling the indicator to indicate to the user to terminate cooking the food being cooked in the second region when the second cooking time in the second cooking region has exceeded a predetermined second time.

15. The method of claim 11, wherein the indicating of the cooking method comprises outputting a signal corresponding to the cooking method to be indicated.

\* \* \* \* \*